(12) United States Patent
Sun et al.

(10) Patent No.: US 9,733,759 B2
(45) Date of Patent: Aug. 15, 2017

(54) DRIVING CIRCUIT, ARRAY SUBSTRATE, TOUCH DISPLAY DEVICE, AND DRIVING METHOD OF THE TOUCH DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Ying Sun, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 13 days.

(21) Appl. No.: 14/968,110

(22) Filed: Dec. 14, 2015

(65) Prior Publication Data

US 2016/0188091 A1    Jun. 30, 2016

(30) Foreign Application Priority Data

Dec. 31, 2014   (CN) .......................... 2014 1 0852651

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
USPC .................................................. 345/173–174
See application file for complete search history.

(56) References Cited

U.S. PATENT DOCUMENTS

| 8,884,919 B2* | 11/2014 | Sogabe | H01L 27/124 345/174 |
|---|---|---|---|
| 2008/0198140 A1* | 8/2008 | Kinoshita | G06F 3/042 345/173 |
| 2009/0002336 A1* | 1/2009 | Choi | G06F 3/044 345/174 |
| 2012/0038566 A1* | 2/2012 | Lin | G06F 3/042 345/173 |
| 2012/0044166 A1* | 2/2012 | Mizuhashi | G06F 3/0412 345/173 |
| 2016/0188087 A1* | 6/2016 | Sun | G06F 3/044 345/173 |

FOREIGN PATENT DOCUMENTS

| CN | 101281725 B | 12/2011 |
| CN | 102460558 A | 5/2012 |
| CN | 103823589 A | 5/2014 |

\* cited by examiner

*Primary Examiner* — Roy Rabindranath
(74) *Attorney, Agent, or Firm* — Faegre Baker Daniels LLP

(57) ABSTRACT

A driving circuit, an array substrate, a touch display device and a driving method of the touch display device. The first gate driving circuits and the touch driving circuits electrically connected with the first gate driving circuits are disposed in the driving circuit, and the secondary trigger signals outputted from the shift registers of the first gate driving circuit function as the strobe signals of the touch selection outputting units from the touch driving circuits, respectively.

12 Claims, 20 Drawing Sheets

Applying the scanning signals to the scanning lines from each of the groups of scanning lines sequentially and scanning the scanning lines line by line — 61

Generating a touch driving signal by the touch selection outputting unit according to the received secondary trigger signal, within scanning time interval between two adjacent groups of scanning lines — 62

DRIVING CIRCUIT, ARRAY SUBSTRATE, TOUCH DISPLAY DEVICE, AND DRIVING METHOD OF THE TOUCH DISPLAY DEVICE

CROSS-REFERENCE TO RELATED APPLICATION

This application claims priority to Chinese Application No. 201410852651.3, filed Dec. 31, 2014, which is herein incorporated by reference in its entirety.

TECHNICAL FIELD

The present disclosure relates to the field of display technologies and, in particular, to a driving circuit, an array substrate, a touch display device and a driving method of the touch display device.

BACKGROUND

With the development of modern electronic technologies, components are provided in a display device to implement some desired functions such as a capacitive touch sensing function, to provide a user with convenience in use.

Touch driving electrodes are necessary in the display device in the related art in order to implement a capacitive touch sensing function. However, a touch driving circuit configured for providing touch driving signals for the touch driving electrodes is rather complex, so that it is difficult for a display device with the touch driving circuit to have a narrow frame. Additionally, due to its numerous signal inputting terminals, the touch driving circuit needs many output signals from an Integrated Circuit (IC), thereby increasing the cost of the IC.

SUMMARY

In view of the above, embodiments of the disclosure provide a driving circuit, an array substrate, a touch display device and a driving method of the touch display device, to solve technical problems in the related art that the touch driving circuit causes the display device to have a larger, non-narrow frame and the cost of the IC is increased.

In a first example, embodiments of the disclosure provide a driving circuit, comprising:
a first gate driving circuit and a touch driving circuit, wherein,
the first gate driving circuit comprises N stages of shift registers electrically connected in series with each other, N is a positive integer larger than 1, wherein, each stage of shift register from the N stages of shift registers comprises a trigger signal inputting terminal and a secondary trigger signal outputting terminal; and for two adjacent stages of shift registers electrically connected in series from the N stages of shift registers, the secondary trigger signal outputting terminal of the preceding stage of shift register is electrically connected with the trigger signal inputting terminal of the next stage of shift register;
the touch driving circuit comprises M stages of touch selection outputting units for generating touch driving signals, M is a positive integer smaller than or equal to N, each stage of touch selection outputting unit from the M stages of touch selection outputting units comprises a strobe signal inputting terminal; and the strobe signal inputting terminals of the stages of touch selection outputting units from the touch driving circuit are respectively electrically connected with the secondary trigger signal outputting terminals of the corresponding stages of shift registers from the first gate driving circuit.

In a second example, embodiments of the disclosure further provide an array substrate, comprising: a display region and a peripheral region surrounding the display region, wherein, the peripheral region comprises a first driving circuit disposed at one side of the peripheral region, wherein, the first driving circuit is the driving circuit in the first example.

In a third example, embodiments of the disclosure further provide a touch display device, comprising an array substrate, a color filter substrate disposed opposite to the array substrate and a liquid crystal layer between the array substrate and the color filter substrate, wherein, the array substrate is the array substrate in the second example.

In a fourth example, embodiments of the disclosure further provide a driving method of a touch display device, the touch display device comprises a plurality of groups of scanning lines, a plurality of stages of shift registers, and a plurality of stages of touch selection outputting units, wherein, each of the groups of scanning lines comprise a plurality of rows of scanning lines, each stage of shift registers generate a scanning signal for scanning a scanning line and a secondary trigger signal for driving the following stage of shift register, each stage of touch selection outputting unit is configured to generate a touch driving signal according to the received secondary trigger signal, wherein, the driving method comprises:
applying the scanning signals to the scanning lines from each of the groups of scanning lines sequentially and scanning the scanning lines line by line; and
generating a touch driving signal by the touch selection outputting unit according to the received secondary trigger signal, within a scanning time interval between two adjacent groups of scanning lines.

With the driving circuit, the array substrate, the touch display device and the driving method of the touch display device provided by the embodiments of the disclosure, the first gate driving circuits and the touch driving circuits electrically connected with the first gate driving circuits are both disposed in the driving circuit, and the secondary trigger signals outputted from the shift registers of the first gate driving circuit function as the strobe signals of the touch selection outputting units from the touch driving circuits, respectively. Accordingly, the touch driving circuits need not dispose a scanning unit to provide the strobe signals for the touch selection outputting units, such that the touch driving circuits can be rather simple, and not only can easily implement a narrow frame of a touch display device, but also can reduce the number of the output signals of the IC and hence decrease the IC's cost.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become apparent from the following detailed description made to nonrestrictive embodiments by reading the accompanying drawings below, in which.

Figure 1A:
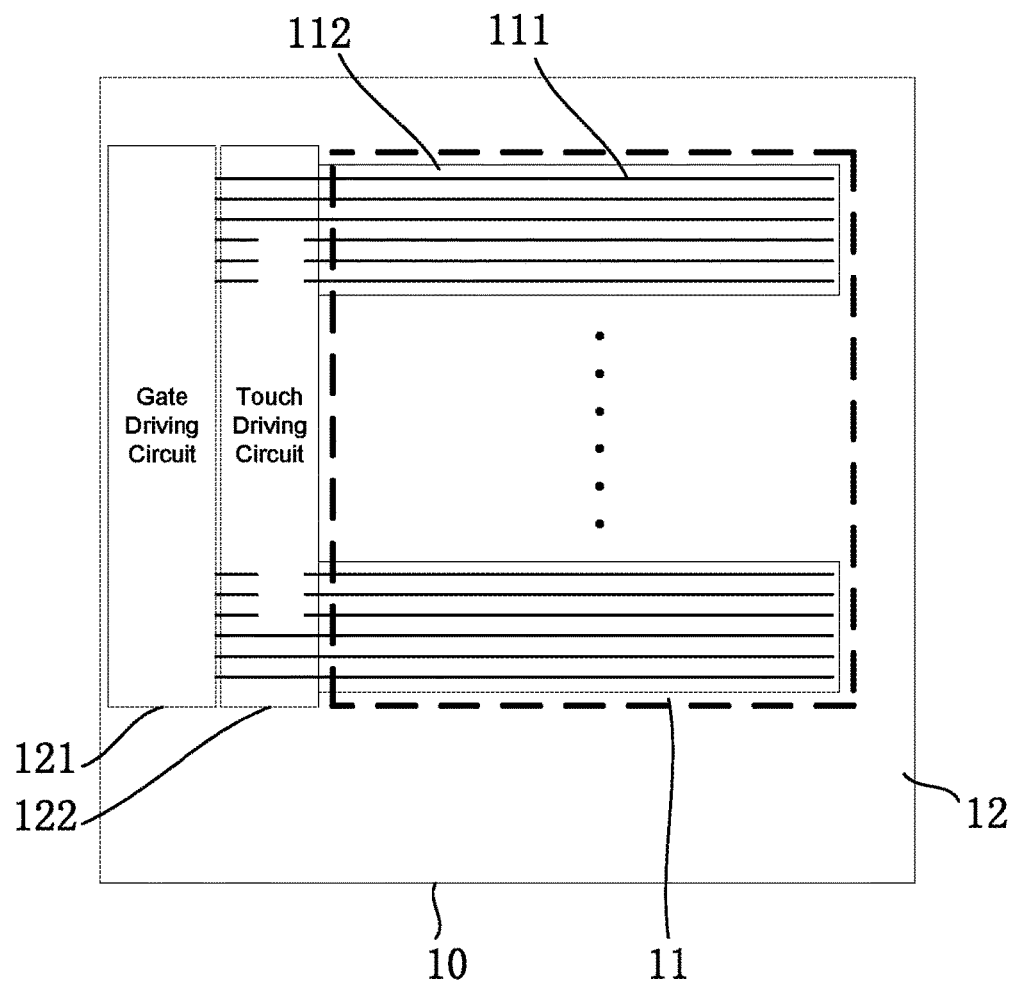
FIG. 1A is a schematic diagram of the structure of an array substrate in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further illustrated in detail below in conjunction with the accompanying drawings and embodiments. It may be understood that specific embodiments described herein are merely for explaining the disclosure rather than limiting the disclosure. Additionally, it is noted that merely partial contents associated with the disclosure rather than all contents are illustrated in the accompanying drawings for ease of description.

In the related art, in order to implement a capacitive touch sensing function, touch sensing electrodes can be disposed at one side of a color filter substrate away from an array substrate, and common electrodes provided in the array substrate are multiplexed as touch driving electrodes, i.e. the common electrodes are configured to receive common voltage signals in a display state, and the common electrodes function as touch driving electrodes in a touch state to receive touch driving signals.

FIG. 1A is a schematic diagram of the structure of an array substrate in the related art. As shown in FIG. 1A, the array substrate includes a display region 11 and a peripheral region 12 surrounding the display region 11, the display region 11 includes a plurality of rows of scanning lines 111 and a plurality of strip common electrodes 112, and the common electrodes 112 are multiplexed as touch driving electrodes; the peripheral region 12 includes a gate driving circuit 121, and a touch driving circuit 122 disposed at the same side as the gate driving circuit 121, where, the gate driving circuit 121 is configured to provide scanning signals for the rows of scanning lines 111, the touch driving circuit 122 is configured to provide touch driving signals for the common electrodes 112 multiplexed as the touch driving electrodes in the touch state and provide common voltage signals for the common electrodes 112 in the display state, and the touch driving circuit 122 is independent of the gate driving circuit 121 in the FIG. 1A.

Figure 1B:
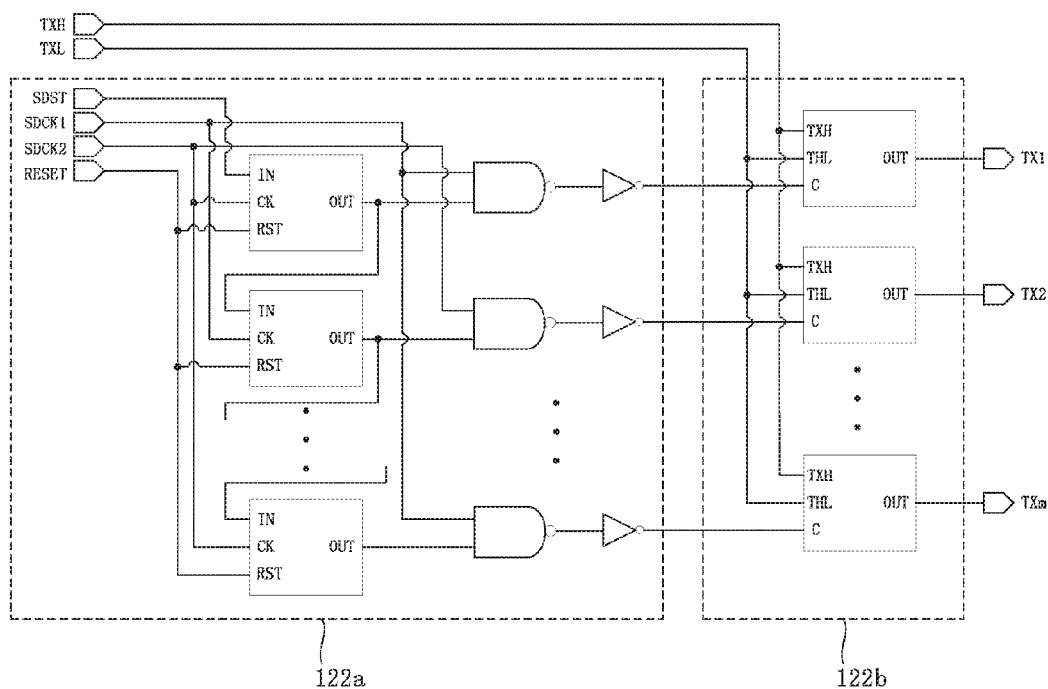
FIG. 1B is a schematic diagram of the structure of a touch driving circuit in the related art.

FIG. 1B is a schematic diagram of the structure of the touch driving circuit in the related art. As shown in FIG. 1B, the touch driving circuit in the FIG. 1A includes a scanning unit 122a and a touch selection outputting unit 122b, where, the scanning unit 122a is configured to provide strobe signals for the touch selection outputting unit 122b to enable the touch selection outputting unit 122b to generate touch driving signals corresponding to the strobe signals. In FIG. 1B, SDST represents a trigger signal inputting terminal, SDCK1 represents a first clock signal inputting terminal, SDCK2 represents a second clock signal inputting terminal, RESET represents a reset signal inputting terminal, TXH represents a first signal inputting terminal, TXL represents a second signal inputting terminal and TX1~TXm represent various touch driving signal outputting terminals, respectively.

As known from FIG. 1B, the touch driving circuit in the related art is rather complex, so that a large space of a frame region of the array substrate is occupied, thereby providing a larger, non-narrow frame of the display device using the array substrate. Additionally, due to too many signal inputting terminals from the touch driving circuit, in particularly too many signal inputting terminals of the scanning unit 122a, the touch driving circuit 122 needs too many output signals from an IC, thereby increasing the IC's cost.

In view of the above, the disclosure provides the following technical solutions.

Figure 2:
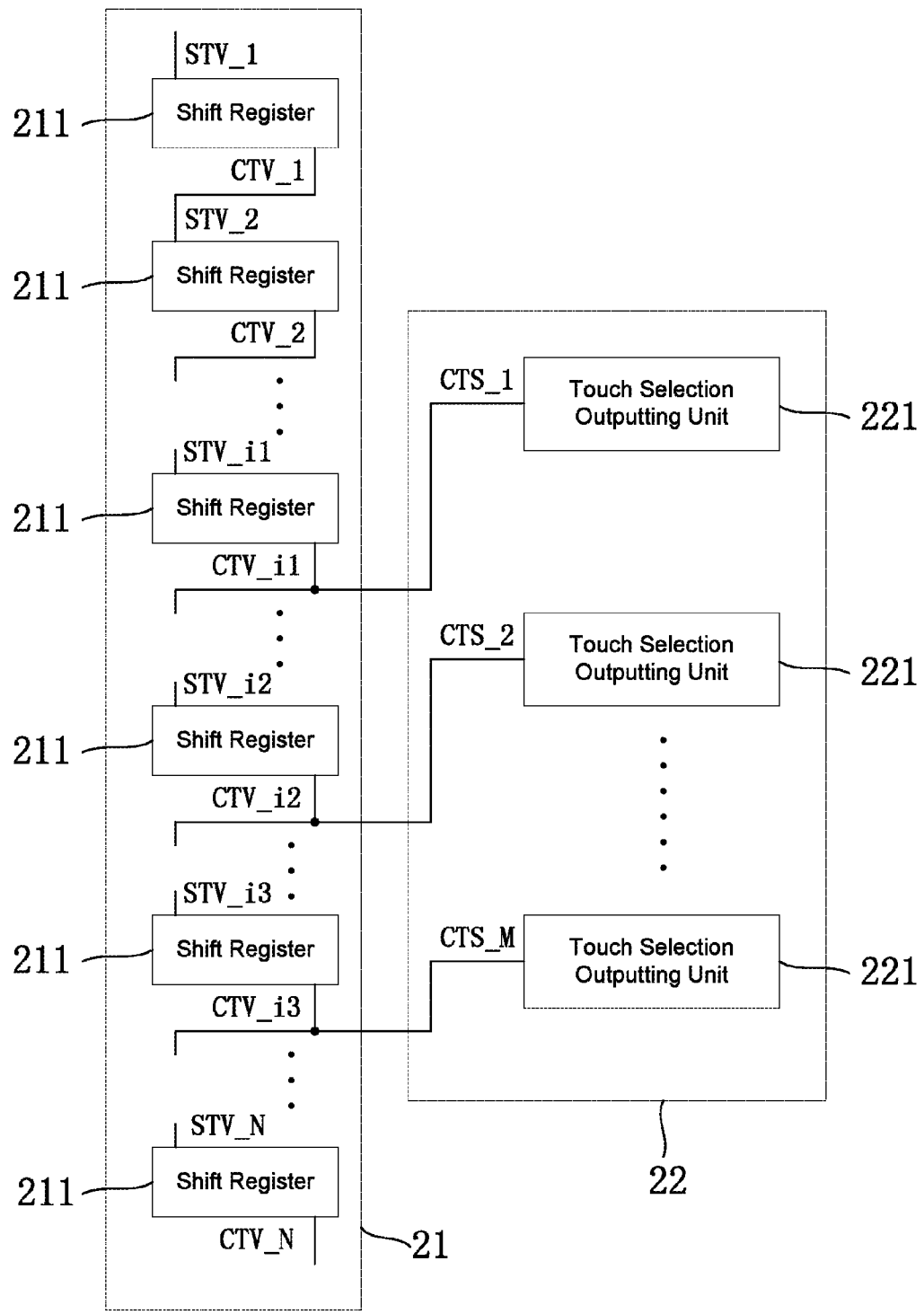
FIG. 2 is a schematic diagram of the structure of a driving circuit, according to embodiments of the disclosure.

Embodiments of the disclosure provide a driving circuit. FIG. 2 is a schematic diagram of the structure of a driving circuit, according to embodiments of the disclosure. As shown in FIG. 2, the driving circuit includes: a first gate driving circuit 21 and a touch driving circuit 22, where, the first gate driving circuit 21 includes N stages of shift registers 211 electrically connected in series with each other, N is a positive integer larger than 1, where, each stage of shift register 211 from the N stages of shift registers 211 includes a trigger signal inputting terminal (STV_1 to STV_N representing the trigger signal inputting terminals of the N stages of shift registers, respectively in FIG. 2) and a secondary trigger signal outputting terminal (CTV1_1 to CTV_N representing the secondary trigger signal outputting terminals of the N stages of shift registers, respectively in FIG. 2); and for two adjacent stages of shift registers 211 electrically connected in series from the N stages of shift registers 211, a secondary trigger signal outputting terminal of the preceding stage of shift register 211 is electrically connected with a trigger signal inputting terminal of the next stage of shift register 211; the touch driving circuit 22 includes M stages of touch selection outputting units 221 for generating touch driving signals, M is a positive integer smaller than or equal to N, each stage of touch selection outputting unit 221 from the M stages of touch selection outputting units includes a strobe signal inputting terminal (CTS_1 to CTS_M representing the strobe signal inputting terminals of the M stages of touch selection outputting units 221, respectively in FIG. 2); and the strobe signal inputting terminals of the stages of touch selection outputting units 221 from the touch driving circuit 22 are respectively electrically connected with the secondary trigger signal outputting terminals of the corresponding stages of shift registers 211 from the first gate driving circuit 21.

In FIG. 2, i1, i2 and i3 all are positive integers larger than or equal to 2 and smaller than N, where, i1 is smaller than i2, and i2 is smaller than or equal to i3.

The touch driving circuit 22 includes M stages of touch selection outputting units 221 for generating touch driving signals, where, the strobe signal inputting terminals of the stages of touch selection outputting units 221 from the touch driving circuit 22 are respectively electrically connected with the secondary trigger signal outputting terminals of the corresponding stages of shift registers 211 from the first gate driving circuit 21. In comparison with the case that the gate driving circuit is independent of the touch driving circuit and the scanning units in the touch driving circuit provide the strobe signals for corresponding touch selection outputting units, in the technical solutions provided by the disclosure, the first gate driving circuit 21 is electrically connected with the touch driving circuit 22, and the secondary trigger signals outputted from the shift registers 211 in the first gate driving circuit 21 function as the strobes signals for the corresponding touch selection outputting units 221 in the touch driving circuit 22, such that the touch driving circuit 22 does not need the additional scanning units to provide the strobe signals for the touch selection outputting units 221 and thus can be rather simple in configuration, thereby reducing the space occupied by the touch driving circuit 22. Additionally, since the scanning unit (shown in FIG. 1B) has many signal inputting terminals and hence the IC has many output signals, the technical solutions provided by the present disclosure can further reduce the output signals from the IC, thereby decreasing the IC's cost.

Figure 3A:
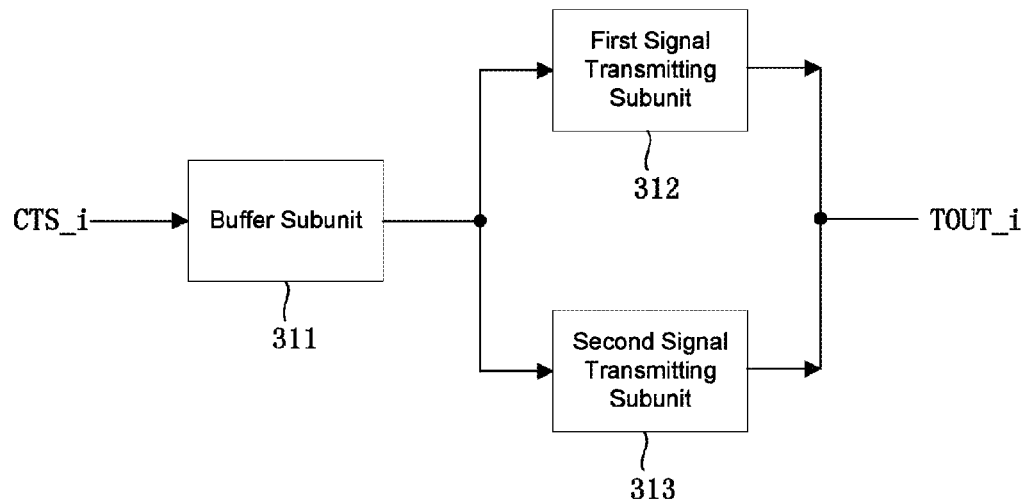
FIG. 3A is a schematic diagram of the structure of a touch selection outputting unit, according to embodiments of the disclosure.

In embodiments of the disclosure, as shown in FIG. 3A, each stage of touch selection outputting unit can further include: a buffer subunit 311, a first signal transmitting subunit 312, a second signal transmitting subunit 313 and a touch driving signal outputting terminal TOUT_i, where, the buffer subunit 311 is configured to buffer the strobe signal received from the strobe signal inputting terminal CTS_i; the first signal transmitting subunit 312 is configured to transmit a first signal according to the strobe signal buffered by the buffer subunit 311, which in turn is outputted from the touch driving signal outputting terminal TOUT_i; and the second signal transmitting subunit 313 is configured to transmit a second signal according to the strobe signal buffered by the buffer subunit 311, which is in turn outputted from the touch driving signal outputting terminal TOUT_i, where, $1 \leq i \leq M$.

It is noted that the strobe signal received from the strobe signal inputting terminal CTS_i is the secondary trigger signal outputted from the secondary trigger signal outputting terminal of the shift register of the first gate driving circuit, such as the first gate driving circuit 21, electrically connected with the strobe signal inputting terminal CTS_i. In other words, the secondary trigger signals generated by the first gate driving circuit function as the corresponding strobe signals of the touch driving circuit.

Figure 3B:
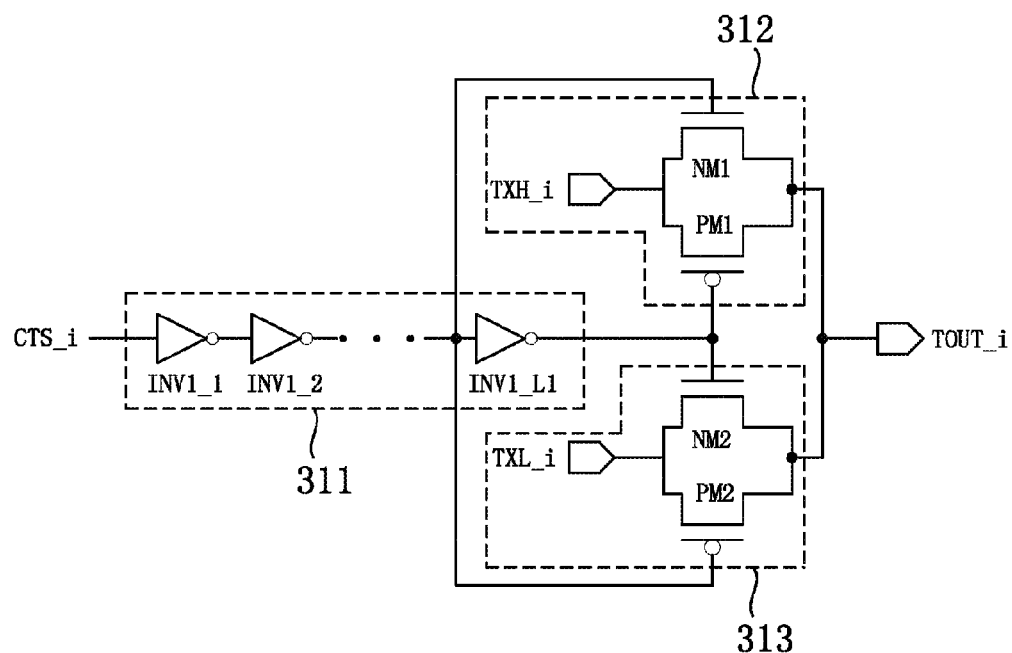
FIG. 3B is a schematic diagram of the circuitry of a touch selection outputting unit, according to embodiments of the disclosure.

In embodiments of the disclosure, as shown in FIG. 3B, the buffer subunit 311 can include L1 first inverters (INV1_1 to INV1_L1) including the first first inverter to the L1-th first inverter electrically connected in series with each other, an input terminal of the first inverter INV1_1 is electrically connected with the strobe signal inputting terminal CTS_i, and the L1-th first inverter INV1_L1 is electrically connected with the first signal transmitting subunit 312 and the second signal transmitting subunit 313, where, L1 is a positive integer; the first signal transmitting subunit 312 may include a first N-channel Metal Oxide Semiconductor (NMOS) transistor NM1, a first P-channel Metal Oxide Semiconductor (PMOS) transistor PM1 and a first signal inputting terminal TXH_i, where, a gate electrode of the first NMOS transistor NM1 is electrically connected with an input terminal of the L1-th first inverter INV_L1, and a gate electrode of the first PMOS transistor PM1 is electrically connected with an output terminal of the L1-th first inverter INV_L1; a source electrode of the first NMOS transistor NM1 and a drain electrode of the first PMOS transistor PM1 are electrically connected with each other and further electrically connect with the first signal inputting terminal TXH_i, and a drain electrode of the first NMOS transistor NM1 and a source electrode of the first PMOS transistor PM1 are electrically connected with each other and further electrically connect with the touch driving signal outputting terminal TOUT_i; and the second signal transmitting subunit 313 includes a second NMOS transistor NM2, a second PMOS transistor PM2 and a second signal inputting terminal TXL_i, where, a gate electrode of the second PMOS transistor PM2 is electrically connected with an input terminal of the L1-th first inverter INV1_L1, and a gate electrode of the second NMOS transistor NM2 is electrically connected with an output terminal of the L1-th first inverter INV1_L1; a source electrode of the second NMOS transistor NM2 and a drain electrode of the second PMOS transistor PM2 are electrically connected with each other and further electrically connect with the second signal inputting terminal TXL_i, and a drain electrode of the second NMOS transistor NM2 and a source electrode of the second PMOS transistor PM2 are electrically connected with each other and further electrically connect with the touch driving signal outputting terminal TOUT_i.

Figure 3C:
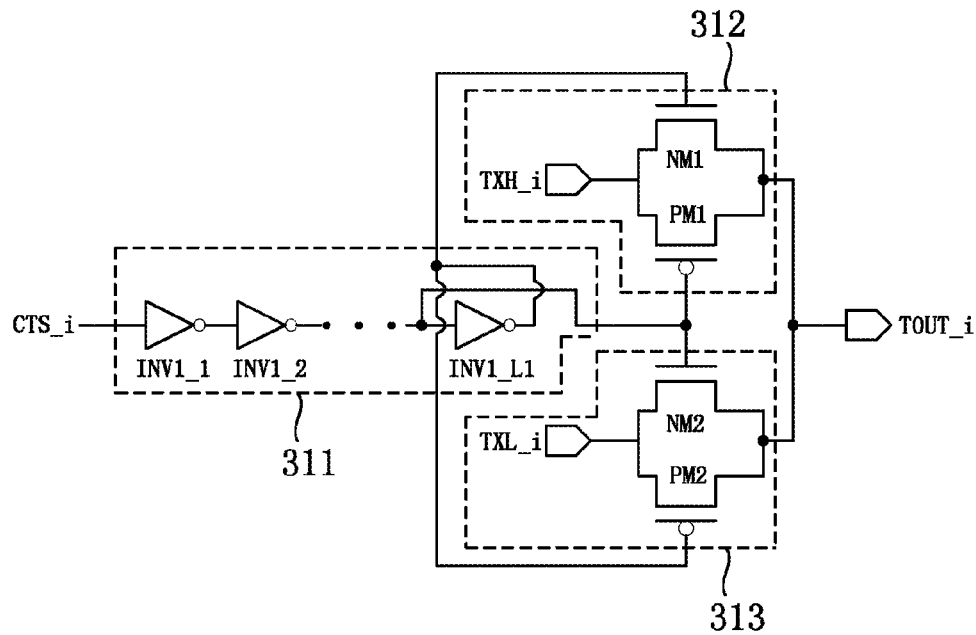
FIG. 3C is a schematic diagram of the circuitry of another touch selection outputting unit, according to embodiments of the disclosure.

In FIG. 3B, L1 is an odd number. However, L1 may also be an even number, as shown in FIG. 3C, it is different from FIG. 3B in that a gate electrode of the first PMOS transistor PM1 is electrically connected with an input terminal of the L1-th first inverter INV1_L1, and a gate electrode of the first NMOS transistor NM1 is electrically connected with an output terminal of the L1-th first inverter INV1_L1; a gate electrode of the second NMOS transistor NM2 is electrically connected with an input terminal of the L1-th first inverter INV1_L1, and a gate electrode of the second PMOS transistor PM2 is electrically connected with an output terminal of the L1-th first inverter INV1_L1.

Since the operating principle of the touch selection outputting unit shown in FIG. 3B is the same as that shown in FIG. 3C, merely the operating principle of the touch selection outputting unit shown in FIG. 3B is illustrated below, for example.

Figure 3D:
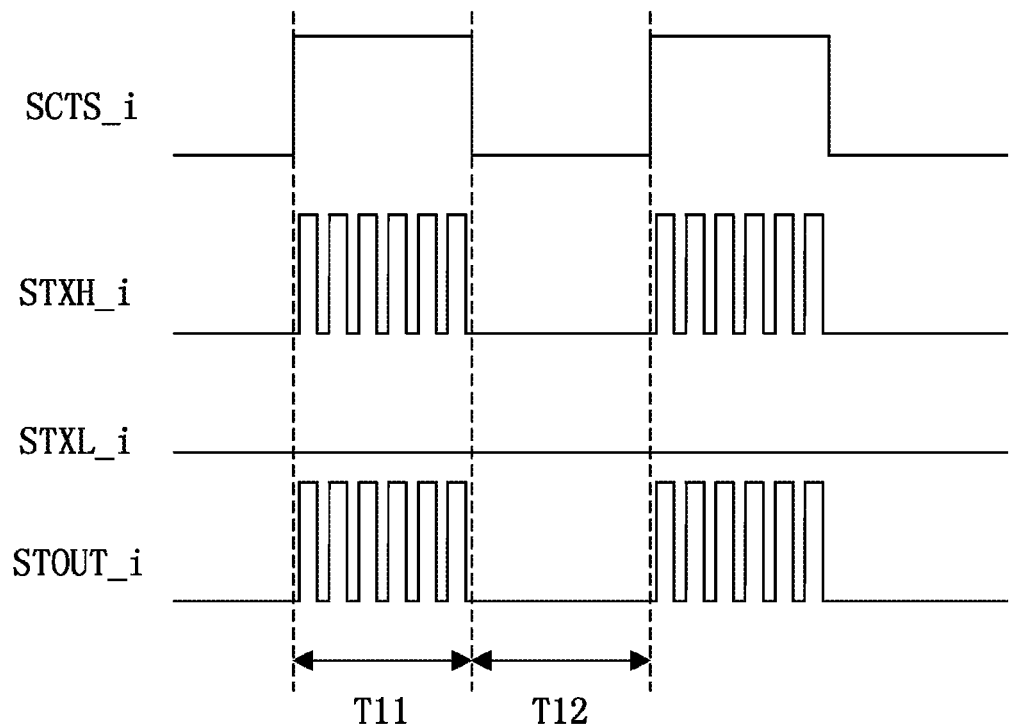
FIG. 3D is a timing diagram of the input signals from various input terminals and the output signals from various output terminals in FIG. 3B.

FIG. 3D is a timing diagram of the input signals from various input terminals and the output signals from various output terminals in FIG. 3B. In FIG. 3D, SCTS_i represents the strobe signal received from the strobe signal inputting terminal CTS_i; STXH_i represents the first signal received from the first signal inputting terminal TXH_i; STXL_i represents the second signal received from the second signal inputting terminal TXL_i; STOUT_i represents the touch driving signal outputted from the touch driving signal outputting terminal TOUT_i, where, at a time of outputting the touch driving signal from the touch selection outputting unit, the first signal is a pulse signal including a plurality of pulses, and at other times, the first signal is a low level signal. The second signal is a low level signal. The operating principle of the touch selection outputting unit shown in FIG. 3B is further illustrated below in combination with FIG. 3D.

As shown in FIG. 3B and FIG. 3D, in a stage T11, the strobe signal SCTS_i is at a high level, so that the first NMOS transistor NM1 and the first PMOS transistor PM1 are turned on, and the second NMOS transistor NM2 and the second PMOS transistor PM2 are turned off, the first signal STXH_i is transmitted to the touch driving signal outputting terminal TOUT_i via the turned-on first NMOS transistor NM1 and the turned-on first PMOS transistor PM1, and in turn functions as the touch driving signal in this stage. Since the touch driving signal is a pulse signal in this stage, the touch driving signal in this stage is an active touch driving signal.

In a stage T12, the strobe signal SCTS_i is at a low level, so that the first NMOS transistor NM1 and the first PMOS transistor PM1 are turned off, and the second NMOS transistor NM2 and the second PMOS transistor PM2 are turned on, the second signal STXL_i is transmitted to the touch driving signal outputting terminal TOUT_i via the turned-on second NMOS transistor NM2 and the turned-on second PMOS transistor PM2, and in turn functions as the touch driving signal in this stage. Since the touch driving signal is a low level signal in this stage, the touch driving signal in this stage is an inactive touch driving signal, and correspondingly the second signal may be a common voltage signal.

In embodiments of the disclosure, shift registers electrically connected with any two adjacent stages of the touch selection outputting units are spaced by the same number of stages of shift registers, which can simplify electrical connection between the touch selection outputting unit and the shift register, thereby reducing design time and improving design efficiency.

Figure 4:
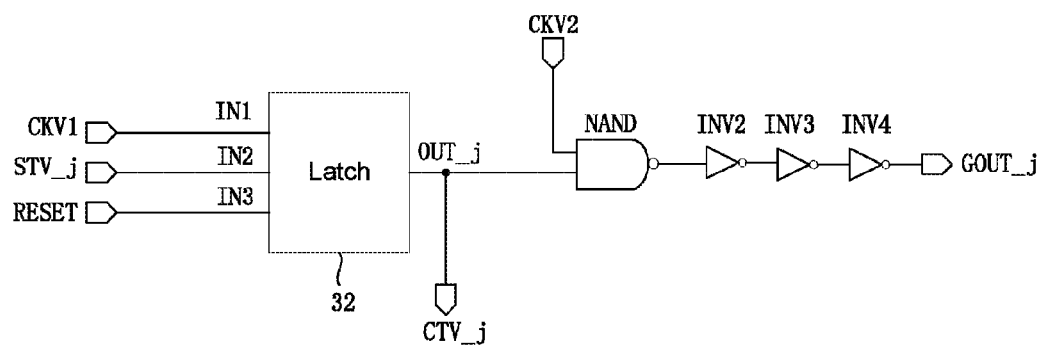
FIG. 4 is a schematic diagram of the structure of a shift register, according to embodiments of the disclosure.

In embodiments of the disclosure, as shown in FIG. 4, the touch driving circuit may further include: a latch 32, an NAND gate, a second inverter INV2, a third inverter INV3, a fourth inverter INV4, a first clock signal inputting terminal CKV1, a second clock signal inputting terminal CKV2, a reset signal inputting terminal RESET, and a scanning signal outputting terminal GOUT_j; a first input terminal IN1 of the latch 32 is electrically connected with the first clock signal inputting terminal CKV1 of the stage of shift register, a second input terminal IN2 of the latch 32 is electrically connected with the trigger signal inputting terminal STV_j of the stage of shift register, a third input terminal IN3 of the latch 32 is electrically connected with the reset signal inputting terminal RESET of the stage of shift register, and an output terminal OUT_j of the latch 32 is electrically connected with the secondary trigger signal outputting terminal CTV_j; a first input terminal of the NAND gate is electrically connected with the output terminal OUT_j of the latch 32, a second input terminal of the NAND gate is electrically connected with the second clock signal inputting terminal CKV2, an output terminal of the NAND is electrically connected with an input terminal of the second inverter INV2; the second inverter INV2, the third inverter INV3 and the fourth inverter INV4 are electrically connected in series sequentially, and an output terminal of the fourth inverter INV4 is electrically connected with the scanning signal outputting terminal GOUT_j, where, $1 \leq j \leq N$.

The operating principle of the shift register shown in FIG. 4 is well known by those skilled in the art, which is not repeatedly discussed again.

Figure 5:
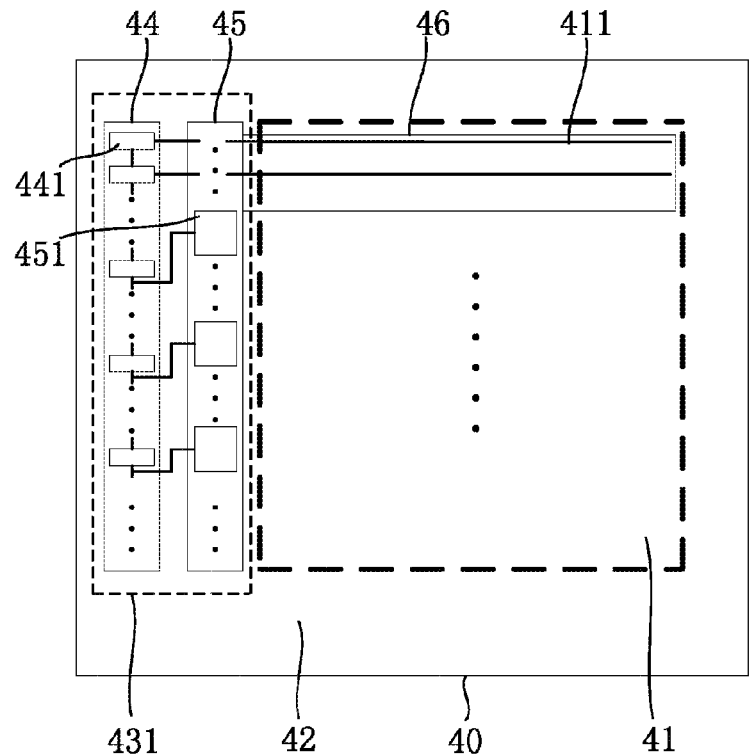
FIG. 5 is a schematic diagram of the structure of an array substrate, according to embodiments of the disclosure.

Embodiments of the disclosure further provide an array substrate. FIG. 5 is a schematic diagram of the structure of an array substrate, according to embodiments of the disclosure. As shown in FIG. 5, the array substrate 40 includes a display region 41 and a peripheral region 42 surrounding the display region 41, the peripheral region 42 includes a first driving circuit 431 disposed at one side of the peripheral region 42 (for example, a left side of the peripheral region 42 in FIG. 5), where, the first driving circuit 431 is the driving circuit according to the above embodiments.

As shown in FIG. 5, the display region 41 includes N rows of scanning lines 411, and each stage of shift register 441 from the first gate controlling circuit 44 provides a scanning signal for one of the rows of scanning lines 411, the strobe signal inputting terminals of stages of touch selection outputting units 451 from the touch driving circuit 45 are respectively electrically connected with the secondary trigger signal outputting terminals of the corresponding stages of shift registers 441 from the first gate driving circuit 44.

Figure 6:
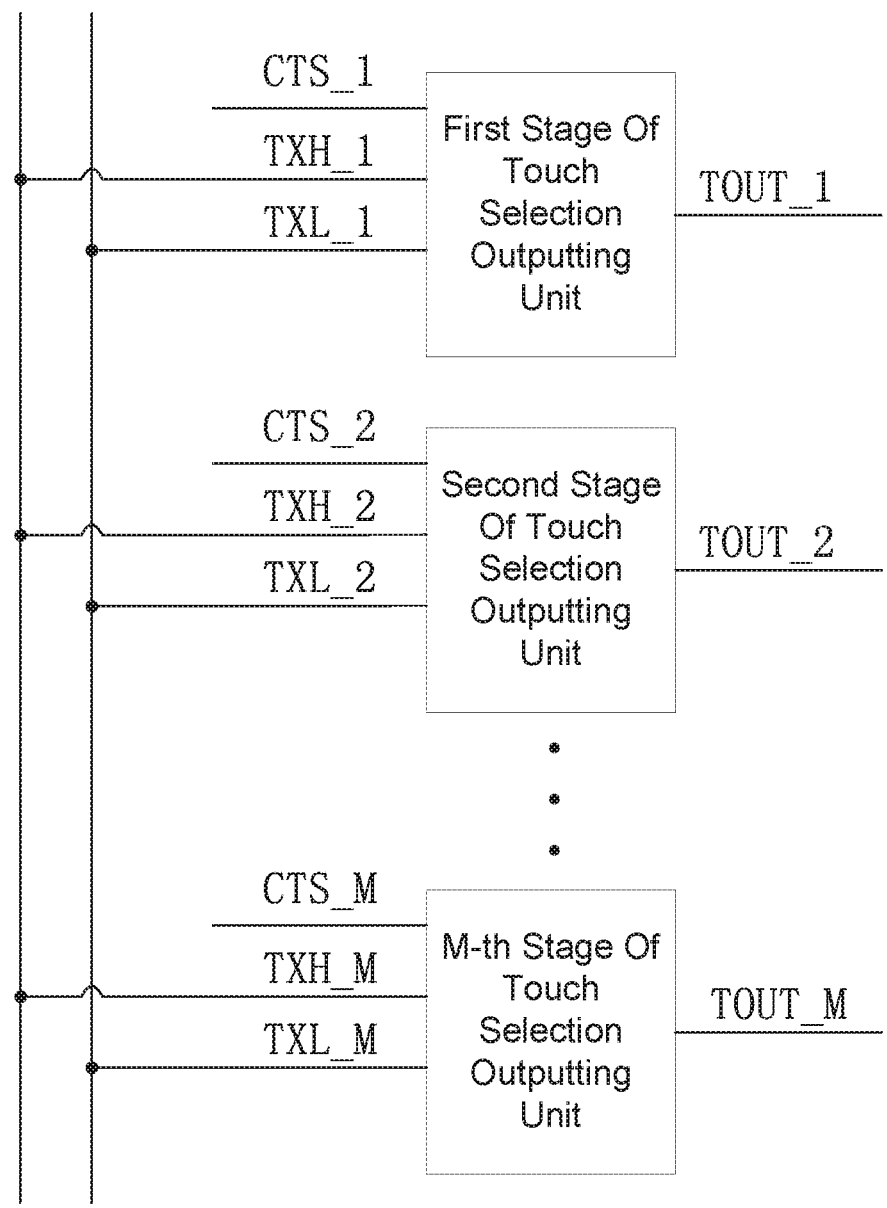
FIG. 6 is a schematic diagram of the structure of a touch driving circuit, according to embodiments of the disclosure.

In embodiments of the disclosure, as shown in FIG. 6, the peripheral region of the array substrate further includes: a first signal line TXH, a second signal line TXL, where, the first signal inputting terminals (TXH_1 to TXH_M) of the stages of touch selection outputting units from the touch driving circuit are electrically connected with the first signal line TXH, and second signal inputting terminals (TXL_1 to TXL_M) of the stages of touch selection outputting unit from the touch driving circuit are electrically connected with the second signal line TXL. In FIG. 6, CTS_1 to CTS_M represent strobe signal inputting terminals of the stages of touch selection outputting units, and TOUT_1 to TOUT_M represent touch driving signal outputting terminals of the stages of touch selection outputting units.

Figure 7:
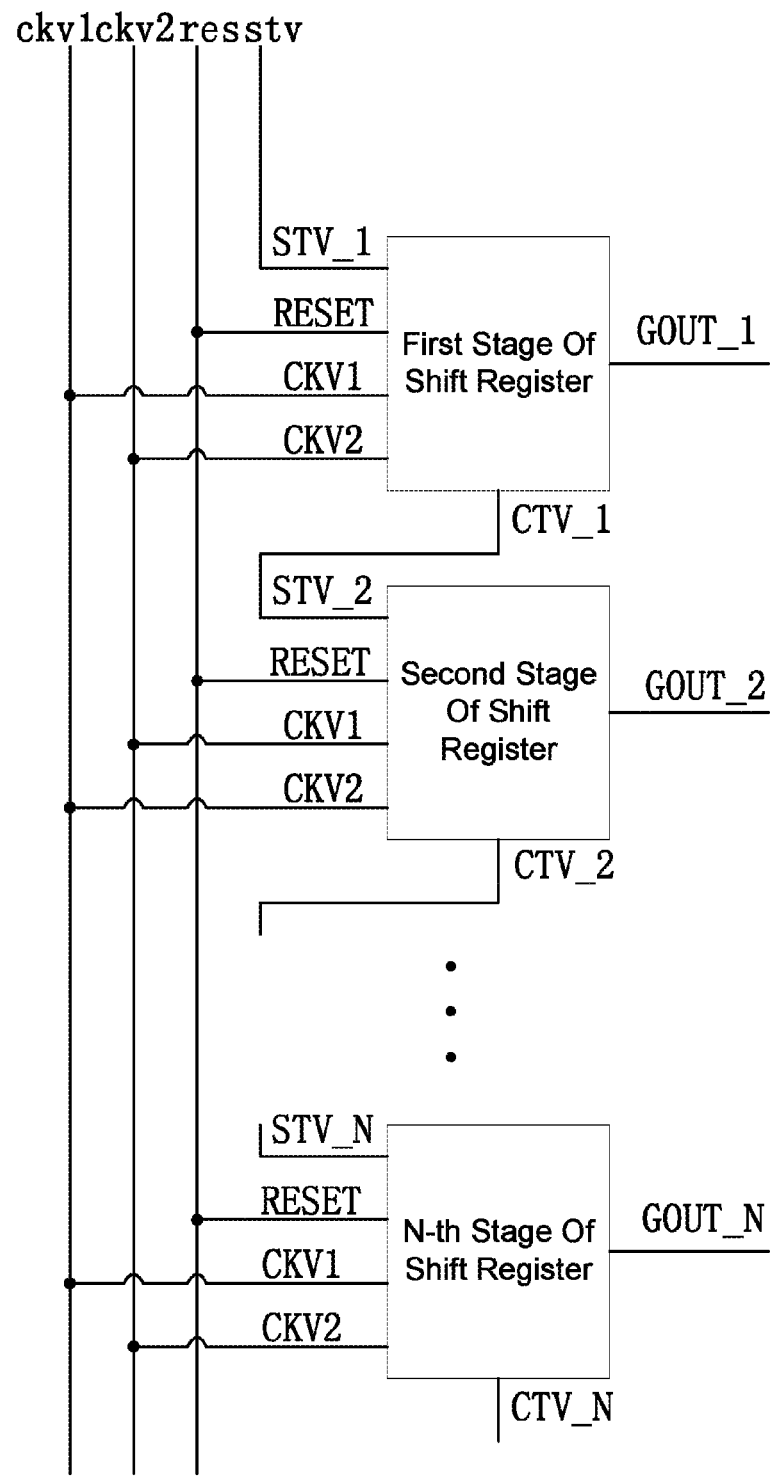
FIG. 7 is a schematic diagram of the structure of a first gate driving circuit, according to embodiments of the disclosure.

In embodiments of the disclosure, as shown in FIG. 7, the peripheral region of the array substrate further includes: a trigger signal line sty, a first reset signal line res, a first clock signal line ckv1 and a second clock signal line ckv2; a trigger signal terminal STV_1 of the first stage of shift register from the first gate driving circuit is electrically connected with the trigger signal line sty, and the reset signal terminal RESET of each stage of shift register from the first gate driving circuit is electrically connected with the first reset signal line res; and the first clock signal inputting terminals CKV1 of the stages of shift registers from the first gate driving circuit are alternately electrically connected with the first clock signal line ckv1 and the second clock signal line ckv2, the second clock signal inputting terminals CKV2 of the stages of shift registers from the first gate driving circuit are alternately electrically connected with the first clock signal line ckv1 and the second clock signal line ckv2, and the clock signal line electrically connected with the first clock signal inputting terminal CKV1 of each stage of shift register is different from the clock signal line electrically connected with the second clock signal inputting terminal CKV2 of the stage of shift register. In FIG. 7, CTV_1 to CTV_N represent the secondary trigger signal outputting terminals of the stages of shift registers, and GOUT_1 to GOUT_N represent the scanning signal outputting terminals of the stages of shift registers. The first clock signal inputting terminal CKV1 of each of the odd stages of shift registers from the stages of shift registers is electrically connected with the first clock signal line ckv1, the second clock signal inputting terminal CKV2 of each of the odd stages of shift registers from the stages of shift registers is electrically connected with the second clock signal line ckv2, the first clock signal inputting terminal CKV1 of each of the even stages of shift registers from the stages of shift registers is electrically connected with the second clock signal line ckv2, and the second clock signal inputting terminal CKV2 of each of the even stages of shift registers from the stages of shift registers is electrically connected with the first clock signal line ckv1.

Next, the operating principle of electrical connection between the touch driving circuits and the first gate driving circuit is further illustrated below, where, the touch driving circuits may be the touch driving circuits shown in FIG. 6, and it is assumed that the number of stages of touch selection outputting units from the touch driving circuit is equal to 2; the first gate driving circuit may be the gate driving circuit shown in FIG. 7, and the number of stages of shift register from the first gate driving circuit is equal to 10.

Figure 8A:
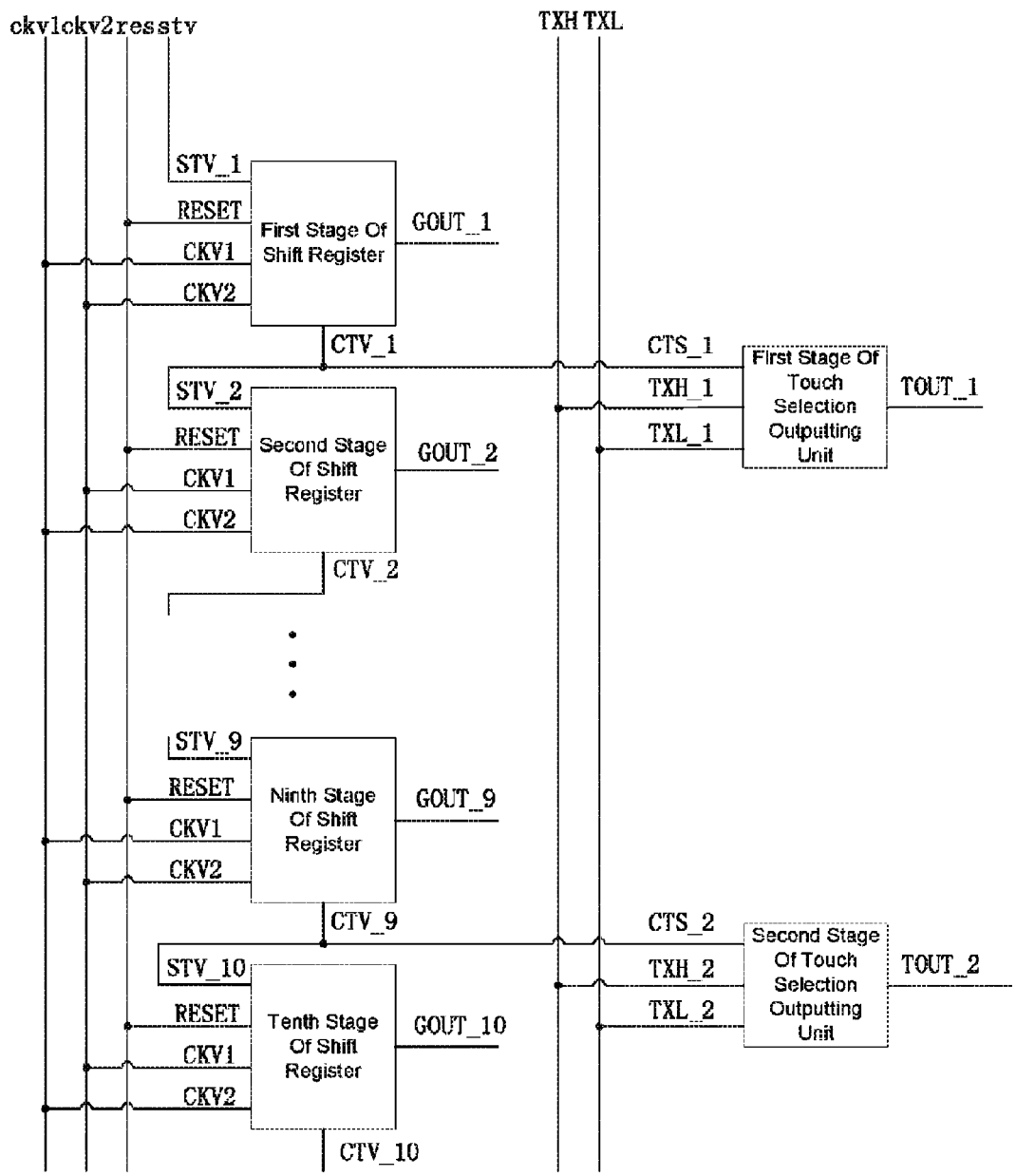
FIG. 8A is a schematic diagram of electrical connection between a first gate driving circuit and a touch driving circuit, according to embodiments of the disclosure.

FIG. 8A is a schematic diagram of electrical connection between a first gate driving circuit and a touch driving circuit, according to embodiments of the disclosure. As shown in FIG. 8A, the first gate driving circuit includes: a first stage of shift register to a tenth stage of shift register; the touch driving circuit includes a first stage of touch selection outputting unit and a second stage of touch selection outputting unit, where, a strobe signal inputting terminal CTS1 of the first stage of touch selection outputting unit is electrically connected with a secondary trigger signal outputting terminal CTV_1 of the first stage of shift register, and a strobe signal inputting terminal CTS_2 of the second stage of touch selection outputting unit is electrically connected with a secondary trigger signal outputting terminal CTV_9 of the ninth stage of shift register.

Figure 8B:
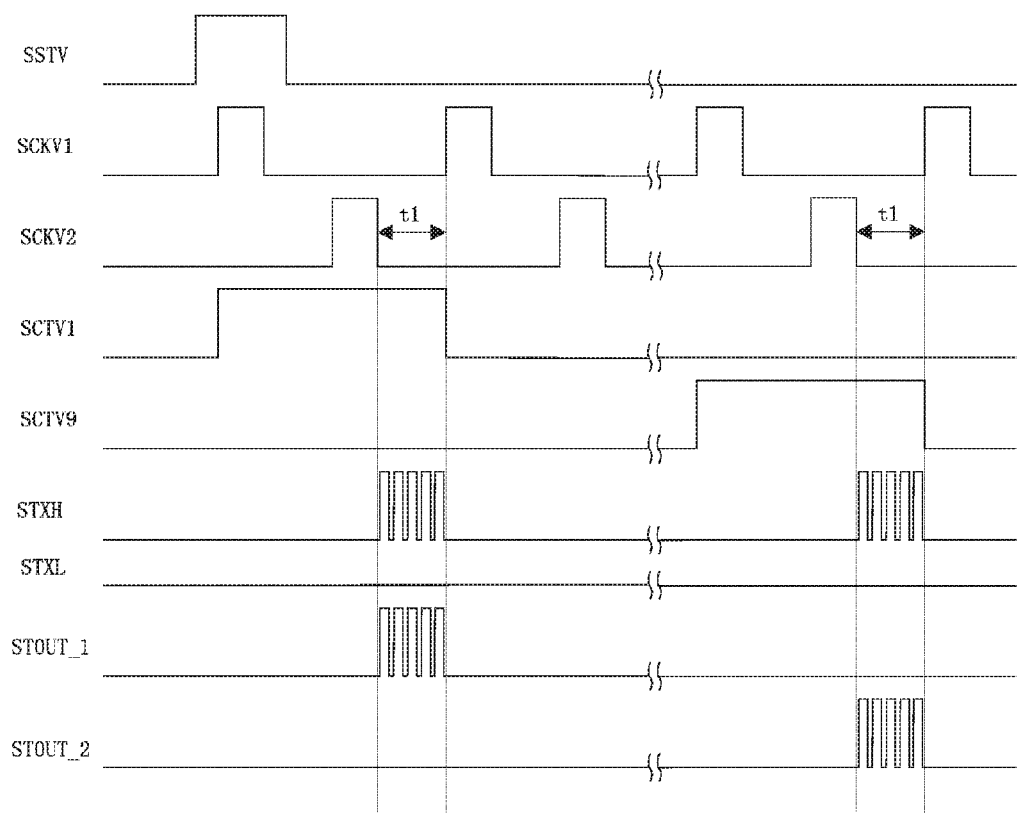
FIG. 8B is a timing diagram of the input signals of various input terminals and the output signals of various output terminals in FIG. 8A.

FIG. 8B is a timing diagram of the input signals of various input terminals and the output signals of various output terminals in FIG. 8A. In FIG. 8B, SSTV represents the trigger signal provided by the trigger signal line sty of the gate driving circuit; SCKV1 represents the first clock signal provided by the first clock signal line ckv1 of the first gate driving circuit; SCKV2 represents the second clock signal provided by the second clock signal line ckv2 of the first gate driving circuit; SCTV1 represents the secondary trigger signal generated by the first stage of shift register; SCTV9 represents the secondary trigger signal generated by the ninth stage of shift register; STXH represents the first signal provided by the first signal line TXH of the touch driving circuit; STXL represents the second signal provided by the second signal line TXL of the touch driving circuit, and the second signal is still a low level signal; STOUT_1 represents the touch driving signal outputted from the first stage of touch selection outputting unit; and STOUT_2 represents the touch driving signal outputted from the second stage of touch selection outputting unit.

In FIG. 8B, the trigger signal SSTV is at a high level to trigger the first gate driving circuit, and the first clock signal SCKV1 and the second clock signal SCKV2 are alternately at a high level to enable each stage of shift register to generate the active scanning signal and the secondary trigger signal (i.e. the scanning signal and secondary trigger signal each having a high level).

In embodiments of the disclosure, the display scanning and the touch scanning are performed in a time division manner. As shown in FIGS. 8A and 8B, the first stage of shift register starts to generate a secondary trigger signal having a high level at a first rising edge (i.e. a time when a low level is changed to a high level for the first time) of the first clock signal SCKV1, and stops generating the secondary trigger signal having a high level at a second rising edge of the first clock signal SCKV1; also, the first stage of shift register starts to generate a scanning signal having a high level at a first rising edge of the second clock signal SCKV2 and stops generating the scanning signal having a high level at a first falling edge of the second clock signal SCKV2. Likewise, the second stage of shift register starts to generate a scanning signal having a high level at a second rising edge of the first clock signal SCKV1 and stops generating the scanning signal having a high level at a second falling edge of the first clock signal SCKV1. Since the display scanning and the touch scanning are performed in a time division manner, even though the secondary trigger signal having a high level from the first stage of shift register drives the first stage of touch selection outputting unit to output the first signal STXH, at this time the first signal STXH is still at a low level. Next, the first signal STXH is changed to a pulse signal at the end of a high level of the scanning signal from the first stage of shift register, i.e., at the first falling edge of the second clock signal SCKV2. Subsequently, the first signal STXH is changed back to a low level at the beginning of a high level of the scanning signal from the third stage of shift register, i.e. at the second rising edge of the first clock signal SCKV1. Therefore, a duration for which the first signal STXH is a pulse signal is a time interval between the scanning signals respectively generated by the first stage of shift register and the second stage of shift register, that is, a time interval t1 between the time at the end of the first high level of the second clock signal SCKV2 and the time at the beginning of the second high level of the first clock signal SCKV1. During the time interval t1, the first touch driving signal STOUT_1 outputted by the first stage of touch selection outputting unit also is a pulse signal, i.e. an active first touch driving signal, and then during the remaining time of a frame of the display scanning other than the time interval t1, the touch driving signal STOUT_1 outputted by the first stage of touch selection outputting unit is a low level signal, i.e. an inactive first touch driving signal. An analysis process of the touch driving signal STOUT_2 generated by the second stage of touch selection outputting unit can refer to the analysis process of the touch driving signal STOUT_1 generated by the first stage of touch selection outputting unit, which is not repeated here.

Figure 8C:
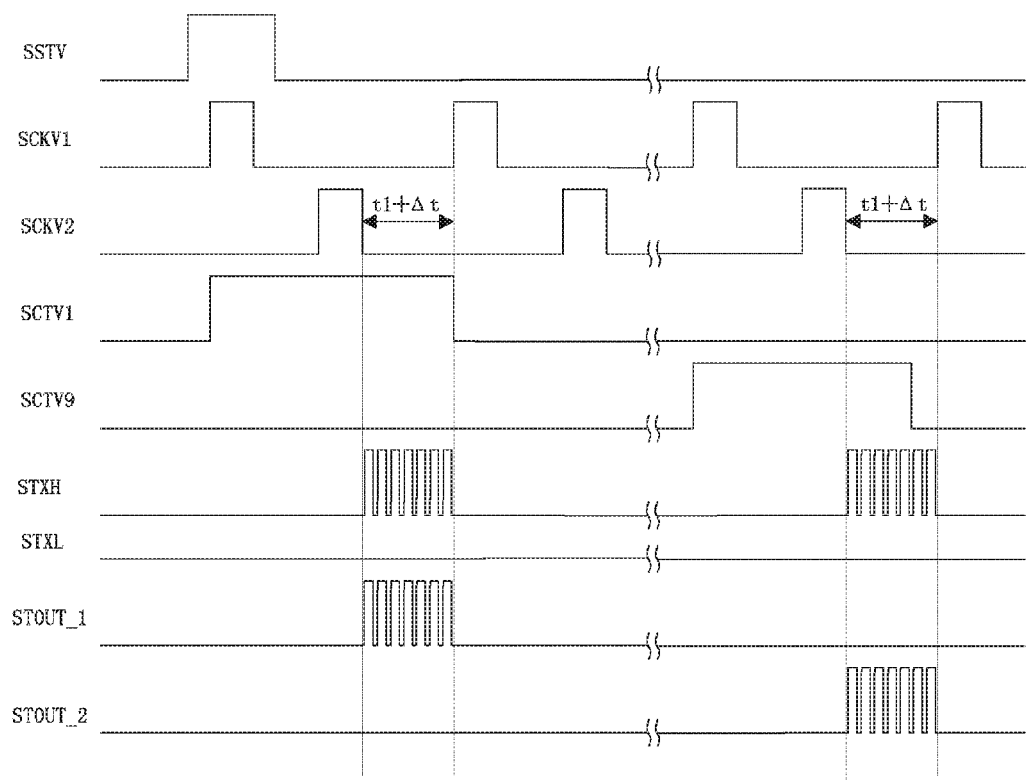
FIG. 8C is another timing diagram of the input signals of various input terminals and the output signals of various output terminals in FIG. 8A.

FIG. 8C is another timing diagram of the input signals of various input terminals and the output signals of various output terminals in FIG. 8A. As shown in FIG. 8C, since the number of pluses contained in a pulse signal of the first signal STXH is increased, the time interval t1 between scanning signals respectively generated by two adjacent stages of shift registers from each gate driving circuit in FIG. 8B cannot meet the duration for which the first signal STXH is a pulse signal in FIG. 8C. Therefore, in FIG. 8C, the time interval between corresponding scanning signals is extended to t1+Δt in order to meet the duration for which the first signal STXH is a pulse signal.

Since the number of pulses contained in a pulse signal of the first signal STXH is changed, accordingly the duration for which the first signal STXH is a pulse signal is also changed. Since a pulse signal of the first signal STXH is to be outputted for the time interval between scanning signals respectively of two adjacent stages of shift registers, if original time interval between scanning signals respectively of two adjacent stages of shift registers cannot meet the duration for which the first signal STXH is a pulse signal, then the time interval between scanning signals respectively of two adjacent stages of shift registers needs to be extended to meet the duration for which the first signal STXH is a pulse signal. The corresponding operation can be achieved by the IC's design. After the designs of the gate driving circuit and the touch driving circuit are finished, the electrical connection between the first gate driving circuit and the touch driving circuit has been determined, so that the duration for which the first signal STXH is a pulse signal is determined. Therefore, the time interval between scanning signals outputted by two adjacent stages of shift registers can be extended with respect to the duration for which the first signal STXH is a pulse signal.

Figure 9:
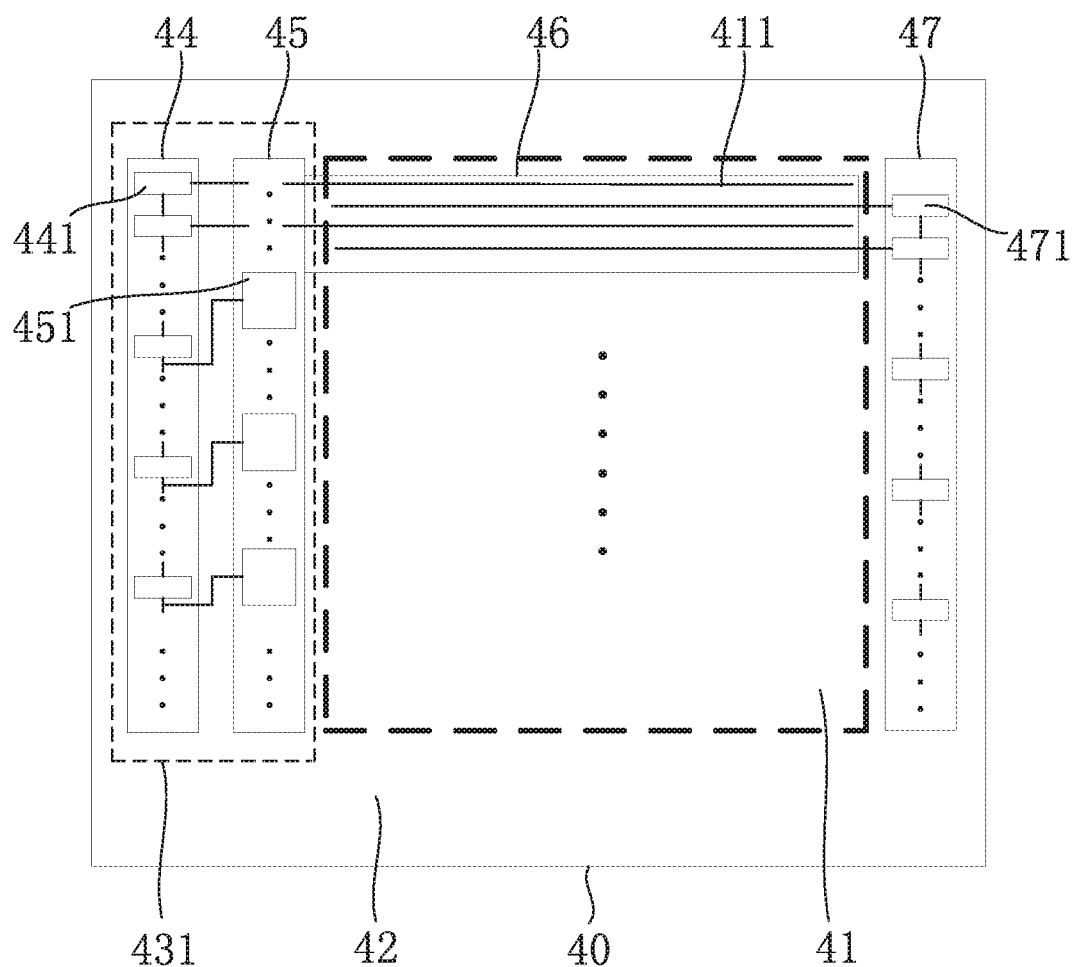
FIG. 9 is a schematic diagram of the structure of another array substrate, according to embodiments of the disclosure.

FIG. 9 is a schematic diagram of the structure of another array substrate, according to embodiments of the disclosure. As shown in FIG. 9, the peripheral region 42 of array substrate 40 includes a second gate driving circuit 47 disposed opposite to the first driving circuit 431, where, the second gate driving circuit 47 is the same as the first gate driving circuit 44 from the first driving circuit 431, and the gate driving circuit of the array substrate includes the first gate driving circuit 44 and the second gate driving circuit 47.

In FIG. 9, the display region 41 includes 2N rows of scanning lines 411, and each stage of shift register 441 from the first gate controlling circuit 44 provides a scanning signal for one of the odd rows of scanning lines 411 from the 2N rows of scanning lines 411, and each stage of shift register 471 from the second gate controlling circuit 47 provides a scanning signal for one of the even rows of scanning lines 411 from the rows of scanning lines 411. It is noted that the array substrate shown in FIG. 9 is an example that the first gate driving circuit 44 and the second gate driving circuit 47 provide scanning signals for the scanning lines in the disclosure, and in another example, the stages of shift registers from the first gate driving circuit may also provide scanning signals for the even rows of scanning lines and the stages of shift registers from the second driving circuit may also provide scanning signals for the odd rows of scanning lines, which is not limited thereto.

In embodiments of the disclosure, the peripheral region of the array substrate further includes: a first signal line, a second signal line, where, the first signal inputting terminal of each stage of touch selection outputting unit from the touch driving circuit is electrically connected with the first signal line, and a second signal inputting terminal of each stage of touch selection outputting unit from the touch driving circuit is electrically connected with the second signal line. It is noted that the above structural diagram of the touch driving circuit is the same as that shown in FIG. 6 and thus can refer to the description of FIG. 6, which is not repeated here.

Figure 10:
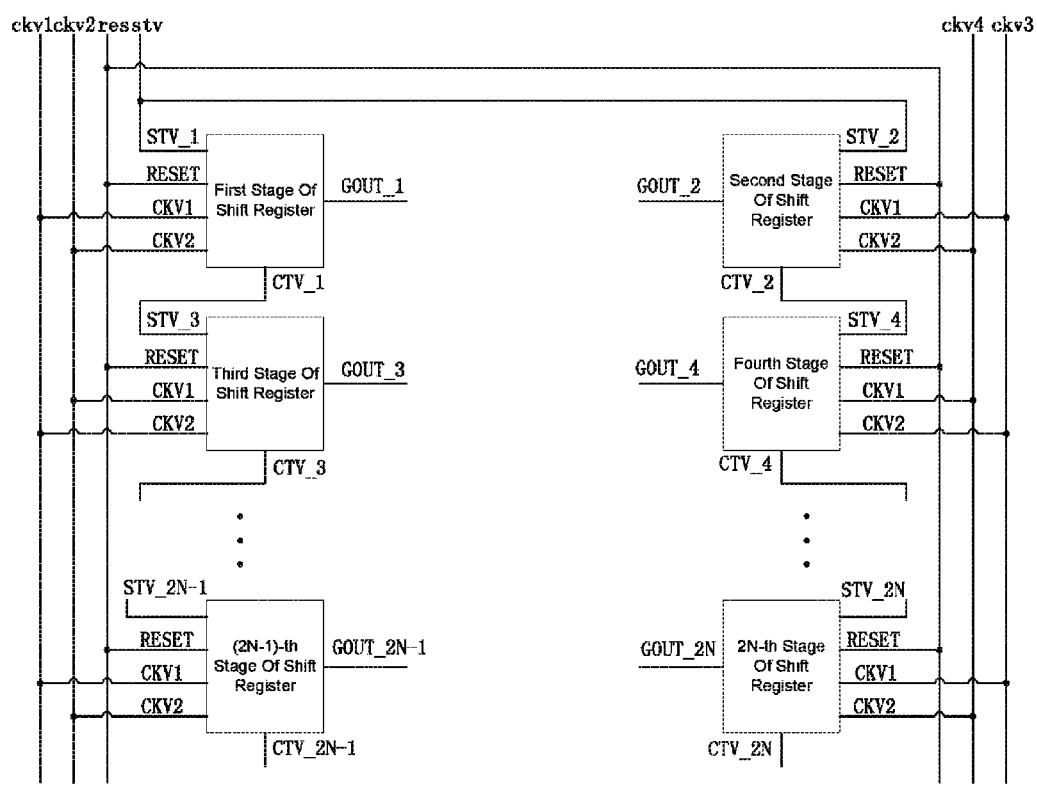
FIG. 10 is a schematic diagram of the structure of a gate driving circuit, according to embodiments of the disclosure.

In embodiments of the disclosure, as shown in FIG. 10, the peripheral region of the array substrate further includes: a trigger signal line sty, a reset signal line res, a first clock signal line ckv1, a second clock signal line ckv2, a third clock signal line ckv3 and a fourth clock signal line ckv4; the trigger signal terminal of the first-numbered stage of shift register from each of the first gate driving circuit and the second gate driving circuit (i.e., the trigger signal terminal of the first stage of shift register STV_1 and the trigger signal terminal of the second stage of shift register STV_2) is electrically connected with the trigger signal line sty, and the reset signal terminal RESET of each stage of shift register from each of the first gate driving circuit and the second gate driving circuit is electrically connected with the reset signal line res; the first clock signal inputting terminals CKV1 of the stages of shift registers from the first gate driving circuit are alternately electrically connected with the first clock signal line ckv1 and the second clock signal line ckv2, the second clock signal inputting terminals CKV2 of the stages of shift registers from the first gate driving circuit are alternately electrically connected with the first clock signal line ckv1 and the second clock signal line ckv2, and the clock signal line electrically connected with the first clock signal inputting terminal CKV1 of each stage of shift register from the first gate driving circuit is different from the clock signal line electrically connected with the second clock signal inputting terminal CKV2 of the stage of shift register; also, the first clock signal inputting terminals CKV1 of the stages of shift registers from the second gate driving circuit are alternately electrically connected with the third clock signal line ckv3 and the fourth clock signal line ckv4, the second clock signal inputting terminals CKV2 of the stages of shift registers from the second gate driving circuit are alternately electrically connected with the third clock signal line ckv3 and the fourth clock signal line ckv4, and the clock signal line electrically connected with the first clock signal inputting terminal CKV1 of each stage of shift register from the second gate driving circuit is different from the clock signal line electrically connected with the second clock signal inputting terminal CKV2 of the stage of shift register. In FIG. 10, CTV_1 to CTV_2N represent secondary trigger signal outputting terminals of the stages of shift registers, and GOUT_1 to GOUT_2N represent scanning signal outputting terminals of the stages of shift registers.

The first clock signal inputting terminals CKV1 of the first stage of shift register, the fifth stage of shift register and the ninth stage of shift register from the first gate driving circuit are electrically connected with the first clock signal inputting terminal ckv1, the second clock signal inputting terminals CKV2 of the first stage of shift register, the fifth stage of shift register and the ninth stage of shift register from the first gate driving circuit are electrically connected with the second clock signal line ckv2; on the contrary, the first clock signal inputting terminals CKV1 of the third stage of shift register, the seventh stage of shift register and the eleventh stage of shift register from the first gate driving circuit are electrically connected with the second clock signal inputting terminal ckv2, and the second clock signal inputting terminals CKV2 of the third stage of shift register, the seventh stage of shift register and the eleventh stage of shift register from the first gate driving circuit are electrically connected with the first clock signal line ckv1. By replacing the first clock signal line ckv1 with the third clock signal line ckv3 and replacing the second clock signal line ckv2 with the fourth clock signal line ckv4, the electrical connection configuration between the clock signal terminals of the second gate driving circuit and the clock signal lines can be obtained.

Next, the operating principle of electrical connection between the touch driving circuits and the gate driving circuits is further illustrated below, where, the touch driving circuits may be the touch driving circuits shown in FIG. 6, and it is assumed that the number of stages of touch selection outputting units from the touch driving circuit is equal to 2; the gate driving circuit may be the gate driving circuit shown in FIG. 10, and the number of stages of shift register from the gate driving circuit is equal to 12.

Figure 11A:
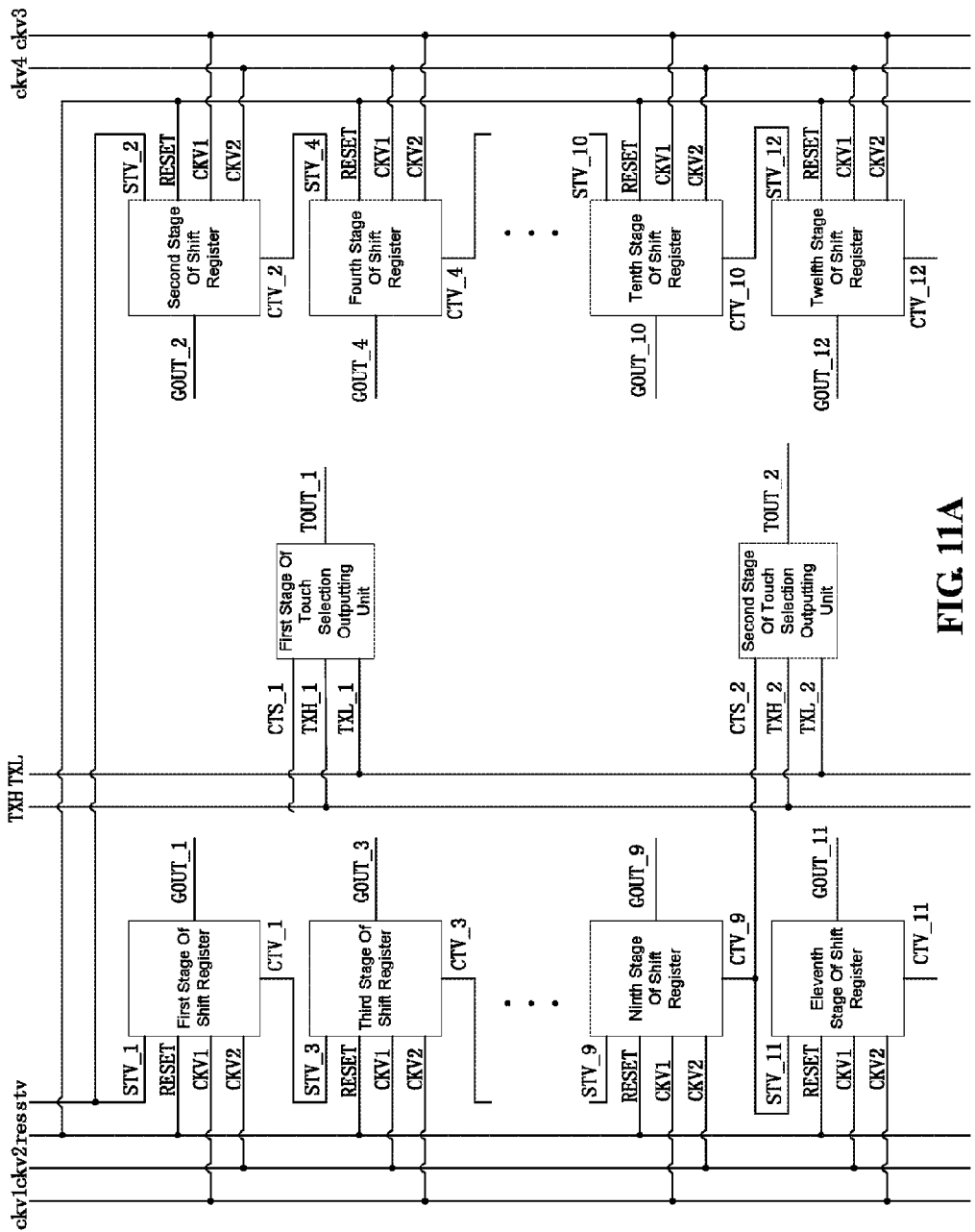
FIG. 11A is a schematic diagram of electrical connection between a gate driving circuit and a touch driving circuit, according to embodiments of the disclosure.

FIG. 11A is a schematic diagram of electrical connection between a gate driving circuit and a touch driving circuit, according to embodiments of the disclosure. As shown in FIG. 11A, the gate driving circuit includes: a first stage of shift register to a twelfth stage of shift register; the touch driving circuit includes a first stage of touch selection outputting unit and a second stage of touch selection outputting unit, where, a strobe signal inputting terminal CTS1 of the first stage of touch selection outputting unit is electrically connected with a secondary trigger signal outputting terminal CTV_1 of the first stage of shift register, and a strobe signal inputting terminal CTS_2 of the second stage of touch selection outputting unit is electrically connected with a secondary trigger signal outputting terminal CTV_9 of the ninth stage of shift register.

Figure 11B:
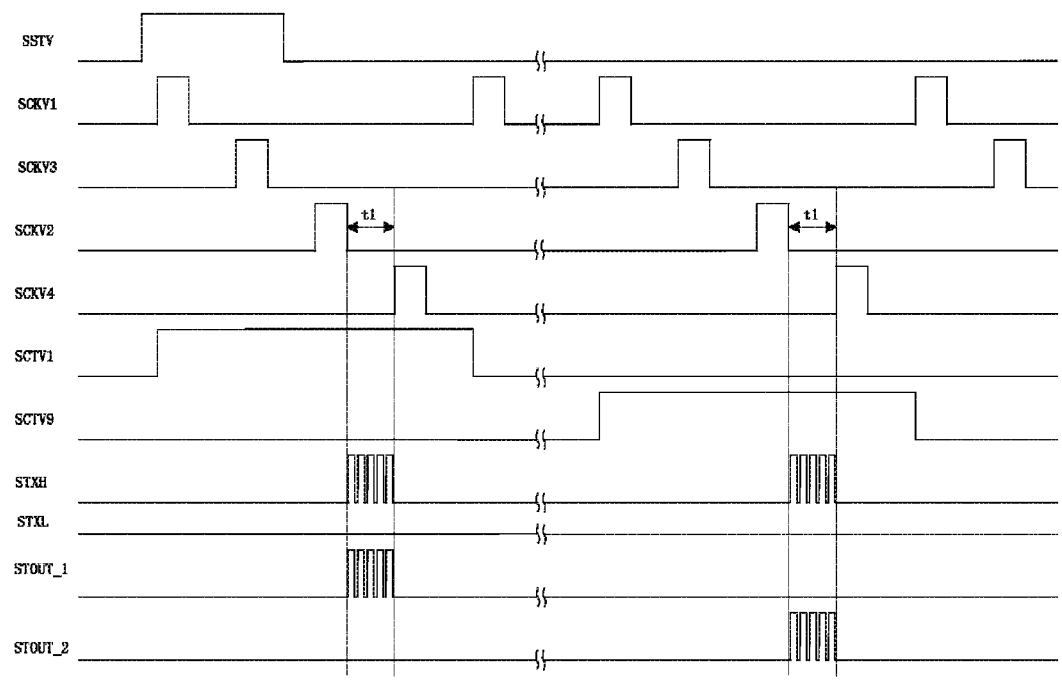
FIG. 11B is a timing diagram of the input signals of various input terminals and the output signals of various output terminals in FIG. 11A.

FIG. 11B is a timing diagram of the input signals of various input terminals and the output signals of various output terminals in FIG. 11A. In FIG. 11B, SSTV represents the trigger signal provided by the trigger signal line sty of the gate driving circuit; SCKV1 represents the first clock signal provided by the first clock signal line ckv1 of the first gate driving circuit; SCKV2 represents the second clock signal provided by the second clock signal line ckv2 of the first gate driving circuit, SCKV3 represents the third clock signal provided by the third clock signal line ckv3 of the second gate driving circuit; SCKV4 represents the fourth clock signal provided by the fourth clock signal line ckv4 of the second gate driving circuit; SCTV1 represents the secondary trigger signal generated by the first stage of shift register; SCTV9 represents the secondary trigger signal generated by the ninth stage of shift register; STXH represents the first signal provided by the first signal line TXH of the touch driving circuit; STXL represents the second signal provided by the second signal line TXL of the touch driving circuit, and the second signal is a low level signal; STOUT_1 represents the touch driving signal outputted from the first stage of touch selection outputting unit; and STOUT_2 represents the touch driving signal outputted from the second stage of touch selection outputting unit.

In FIG. 11B, the trigger signal SSTV is at a high level to cover a first high level of the first clock signal SCKV1 and the third clock signal SCKV3 in order to trigger both the first gate driving circuit and the second gate driving circuit, and the first clock signal SCKV1, the third clock signal SCKV3, the second clock signal SCKV2, and the fourth clock signal SCKV4 are alternately at a high level to enable each stage of shift register to generate the active scanning signal and the secondary trigger signal (i.e. the scanning signal and secondary trigger signal each having a high level).

In embodiments of the disclosure, the display scanning and the touch scanning are performed in a time division manner. As shown in FIG. 11B, the difference between the FIG. 11B and the FIG. 8B is that the first signal STXH is changed to a pulse signal at the end of a high level of the scanning signal from the first stage of shift register, i.e., at the first falling edge of the second clock signal SCKV2. Subsequently, the first signal STXH is changed back to a low level at the beginning of a high level of the scanning signal from the second stage of shift register, i.e. at the first rising edge of the fourth clock signal SCKV4. Therefore, a duration for which the first signal STXH is a pulse signal is a time interval between the scanning signals respectively generated by the first stage of shift register and the second stage of shift register, that is, a time interval t1 between the time at the end of the first high level of the second clock signal SCKV2 and the time at the beginning of the first high level of the fourth clock signal SCKV4. During the time interval t1, the first touch driving signal STOUT_1 outputted by the first stage of touch selection outputting unit also is a pulse signal, i.e. an active touch driving signal, and then during remaining time of a frame of the display scanning other than the time interval t1, the touch driving signal STOUT_1 outputted by the first stage of touch selection outputting unit is a low level signal, i.e. an inactive touch driving signal. An analysis process of the touch driving signal STOUT_2 generated by the second stage of touch selection outputting unit can refer to the analysis process of the touch driving signal STOUT_1 generated by the first stage of touch selection outputting unit, which is not repeated here.

It is noted that, if the number of pluses contained in a pulse signal of the first signal TXH is increased, the time interval between scanning signals respectively generated by two adjacent stages of shift registers needs to be extended, and corresponding timing diagram may refer to FIG. 8C, which is not repeated here.

Figure 12:
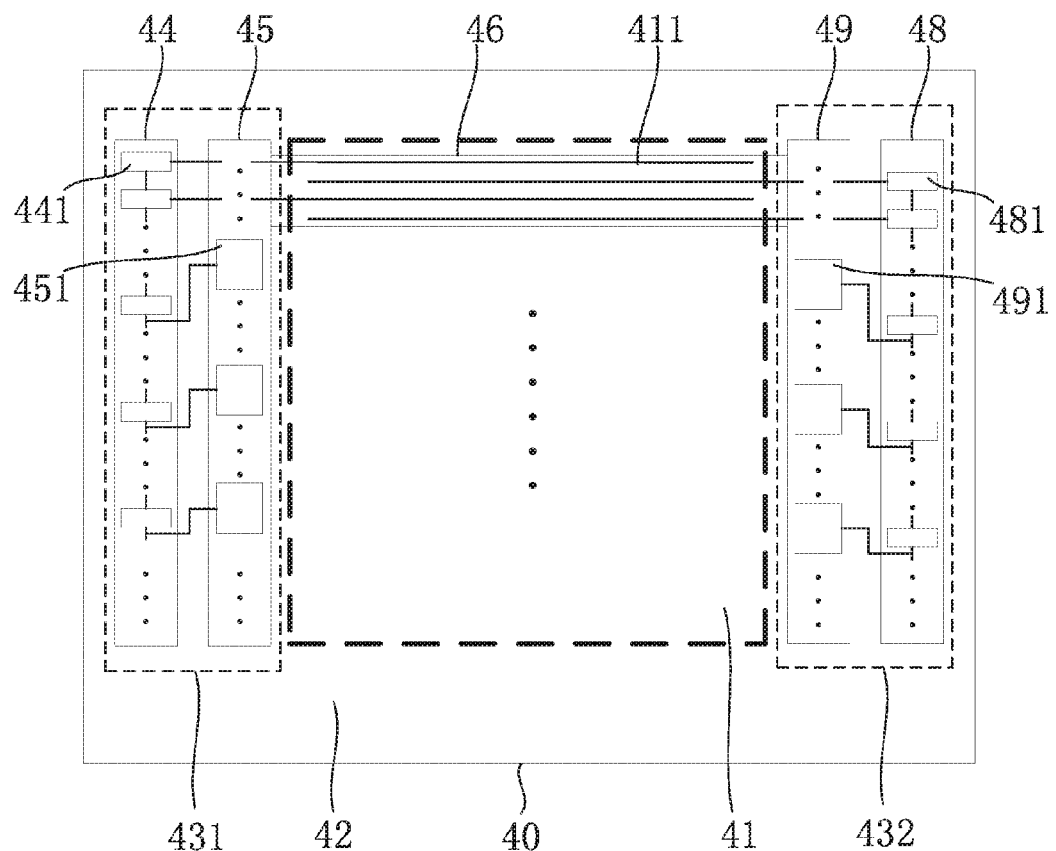
FIG. 12 is a schematic diagram of the structure of another array substrate, according to embodiments of the disclosure.

FIG. 12 is a schematic diagram of the structure of another array substrate, according to embodiments of the disclosure. As shown in FIG. 12, the peripheral region 42 of array substrate 40 further includes a second driving circuit 432 disposed opposite to the first driving circuit 431, where, the second driving circuit 432 is the same as the first driving circuit 431. It is noted that the gate driving circuit of the array substrate includes the first gate driving circuit 44 from the first driving circuit 431 and the first gate driving circuit 48 from the second driving circuit 432, and the touch driving circuit of the array substrate includes the touch driving circuit 45 from the first driving circuit 431 and the touch driving circuit 49 from the second driving circuit 432.

In embodiments of the disclosure, the strobe signal inputting terminals of the stages of the touch selection outputting units respectively from the first driving circuit 431 and the second driving circuit 432 (corresponding to the touch selection outputting unit 451 from the first driving circuit 431 and the touch selection outputting unit 491 from the second driving circuit 432) which are in a same numbered stage are electrically connected with the secondary trigger signal outputting terminals of the stages of shift registers respectively from the first driving circuit 431 and the second driving circuit 432 (corresponding to the shift register 441 from the first driving circuit 431 and the shift register 481 from the second driving circuit 432) which are in a same numbered stage, respectively.

In embodiments of the disclosure, as shown in FIG. 12, the display region 41 includes 2N rows of scanning lines 411, and each stage of shift register 441 from the first driving circuit 431 provides a scanning signal for one of the odd rows of scanning lines 411 from the 2N rows of scanning lines 411, and each stage of shift register 481 from the second driving circuit 432 provides a scanning signal for one of the even rows of scanning lines 411 from the 2N rows of scanning lines 411. It is noted that the array substrate shown in FIG. 12 is an example in the disclosure that the first driving circuit 431 and the second driving circuit 432 provide scanning signals for the scanning lines 411. In another example, the stages of shift registers from the first driving circuit may also provide scanning signals for the even rows of scanning lines and the stages of shift registers from the second driving circuit may also provide scanning signals for the odd rows of scanning lines, which is not limited thereto.

Figure 13:
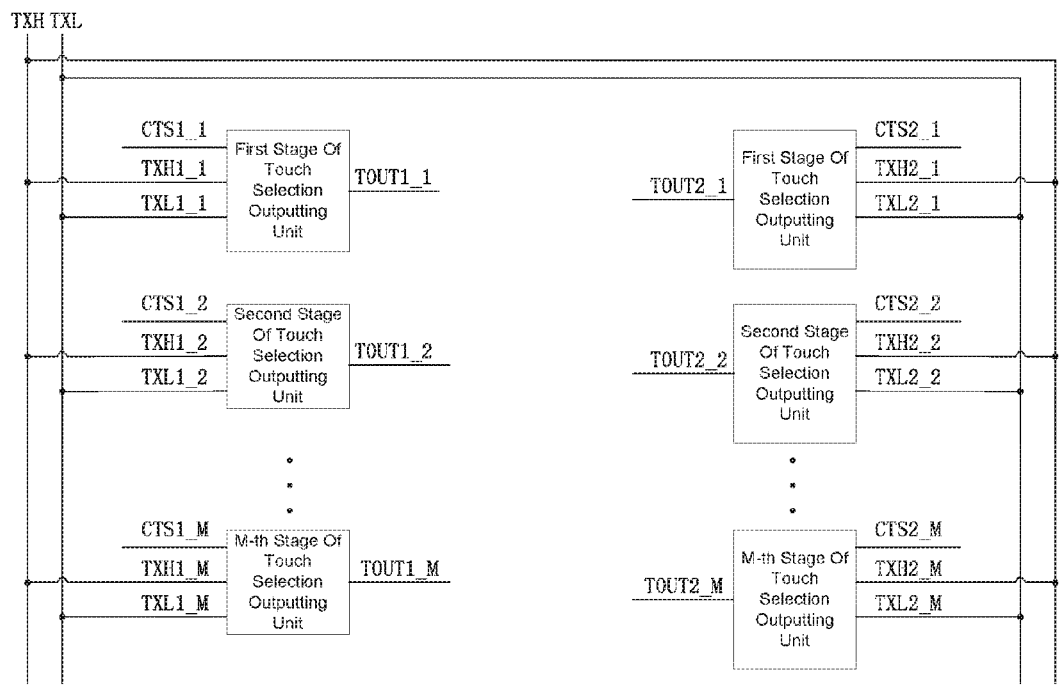
FIG. 13 is a schematic diagram of the structure of another touch driving circuit, according to embodiments of the disclosure.

In embodiments of the disclosure, as shown in FIG. 13, the peripheral region of the array substrate further includes: a first signal line and a second signal line, where, the first signal inputting terminal of each stage of touch selection outputting unit from both the first driving circuit and the second driving circuit (i.e., each of the first signal inputting terminals from the first driving circuit TXH1_1 to TXH1_M and each of the first signal inputting terminals from the second driving circuit TXH2_1 to TXH2_M) is electrically connected with the first signal line TXH, and a second signal inputting terminal of each stage of touch selection outputting unit from both the first driving circuit and the second driving circuit (i.e., each of the second signal inputting terminals from the first driving circuit TXL1_1 to TXL1_M and each of the second signal inputting terminals from the second driving circuit TXL2_1 to TXL2_M) is electrically connected with the second signal line TXL. In FIG. 13, CTS1_1 to CTS1_M represent the strobe signal inputting terminals of the stages of touch selection outputting units from the first driving circuit; TOUT1_1 to TOUT1_M represent the touch driving signal outputting terminals of stages of touch selection outputting units from the first driving circuit; CTS2_1 to CTS2_M represent the strobe signal inputting terminals of the stages of touch selection outputting units from the second driving circuit; and TOUT2_1 to TOUT2_M represent the touch driving signal outputting terminals of the stages of touch selection outputting units from the second driving circuit.

In embodiments of the disclosure, the peripheral region of the array substrate further includes: a trigger signal line, a reset signal line, a first clock signal line, a second clock signal line, a third clock signal line and a fourth clock signal line; the trigger signal terminal of the first-numbered stage of shift register from each of the first driving circuit and the second driving circuit is electrically connected with the trigger signal line, and the reset signal terminal of each stage of shift register from each of the first driving circuit and the second driving circuit is electrically connected with the reset signal line; the first clock signal inputting terminals of the stages of shift registers from the first driving circuit are alternately electrically connected with the first clock signal line and the second clock signal line, the second clock signal inputting terminals of the stages of shift registers from the first driving circuit are alternately electrically connected with the first clock signal line and the second clock signal line, and the clock signal line electrically connected with the first clock signal inputting terminal of each stage of shift register from the first driving circuit is different from the clock signal line electrically connected with the second clock signal inputting terminal of the stage of shift register. Likewise, the first clock signal inputting terminals of the stages of shift registers from the second driving circuit are alternately electrically connected with the third clock signal line and the fourth clock signal line, the second clock signal inputting terminals of the stages of shift registers from the second driving circuit are alternately electrically connected with the third clock signal line and the fourth clock signal line, and the clock signal line electrically connected with the first clock signal inputting terminal of each stage of shift register from the second driving circuit is different from the clock signal line electrically connected with the second clock signal inputting terminal of the stage of shift register. It is noted that the structure diagram of the gate driving circuit described above is the same as that shown in FIG. 10 and thus refers to FIG. 10, which is not repeated here.

Next, the operating principle of electrical connection between the touch driving circuits and the gate driving circuits is further illustrated below, where, the touch driving circuits may be the touch driving circuits shown in FIG. 13, and it is assumed that the number of stages of touch selection outputting units from the touch driving circuit is equal to 4; the gate driving circuit may be the gate driving circuit shown in FIG. 10, and the number of stages of shift register from the gate driving circuit is equal to 12.

Figure 14A:
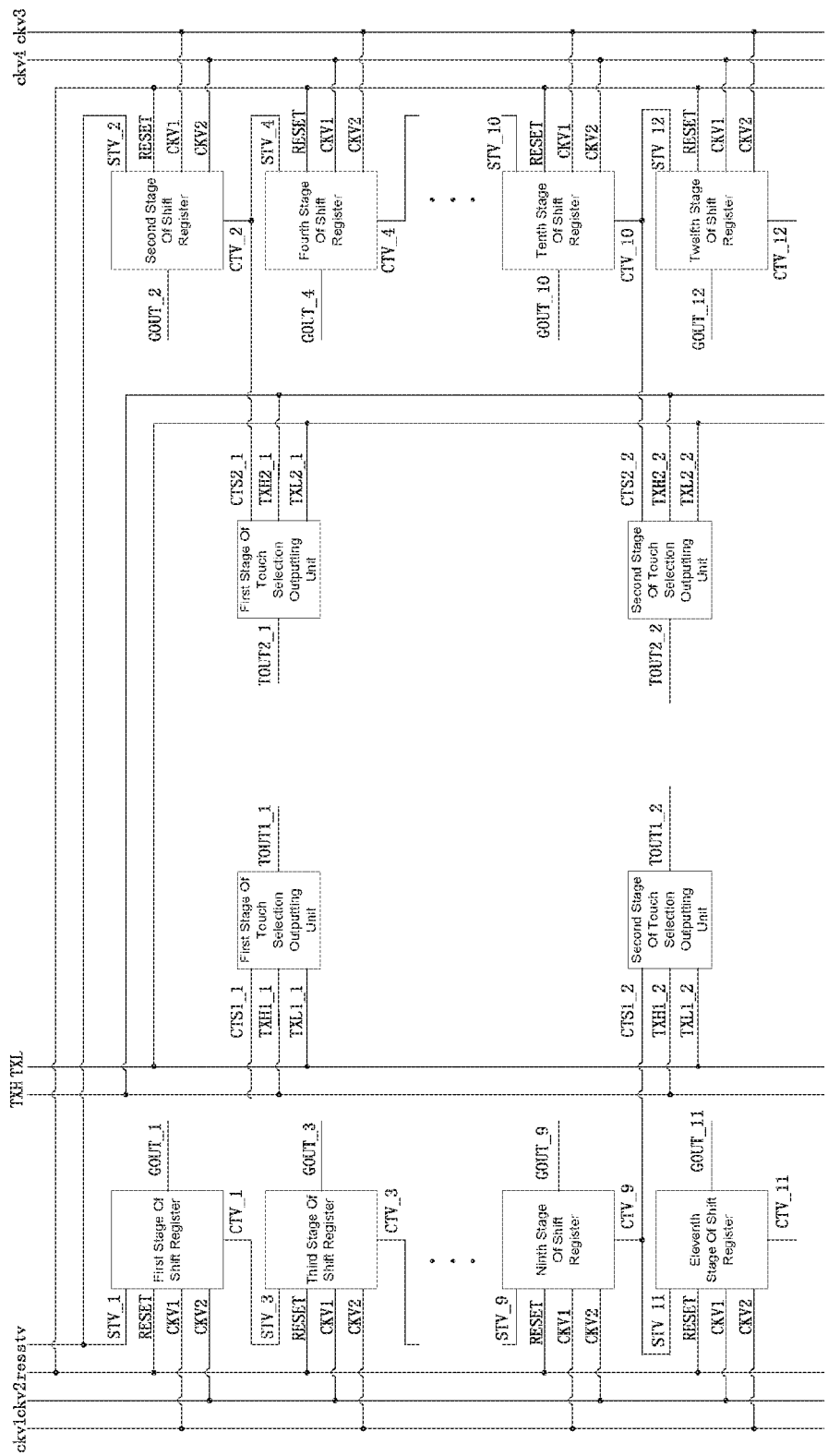
FIG. 14A is a schematic diagram of another electrical connection between a gate driving circuit and a touch driving circuit, according to embodiments of the disclosure.

FIG. 14A is a schematic diagram of electrical connection between a gate driving circuit and a touch driving circuit, according to embodiments of the disclosure. As shown in FIG. 14A, the gate driving circuit includes: a first stage of shift register to a twelfth stage of shift register; the touch driving circuit from the first driving circuit and the second driving circuit each includes a first stage of touch selection outputting unit and a second stage of touch selection outputting unit, where, a strobe signal inputting terminal CTS1_1 of the first stage of touch selection outputting unit from the first driving circuit is electrically connected with a secondary trigger signal outputting terminal CTV_1 of the first stage of shift register, a strobe signal inputting terminal CTS1_2 of the second stage of touch selection outputting unit is electrically connected with a secondary trigger signal outputting terminal CTV_9 of the ninth stage of shift register, a strobe signal inputting terminal CTS2_1 of the first stage of touch selection outputting unit from the second driving circuit is electrically connected with a secondary trigger signal outputting terminal CTV_2 of the second stage of shift register, and a strobe signal inputting terminal CTS2_2 of the second stage of touch selection outputting unit from the second driving circuit is electrically connected with a secondary trigger signal outputting terminal CTV_10 of the tenth stage of shift register.

Figure 14B:
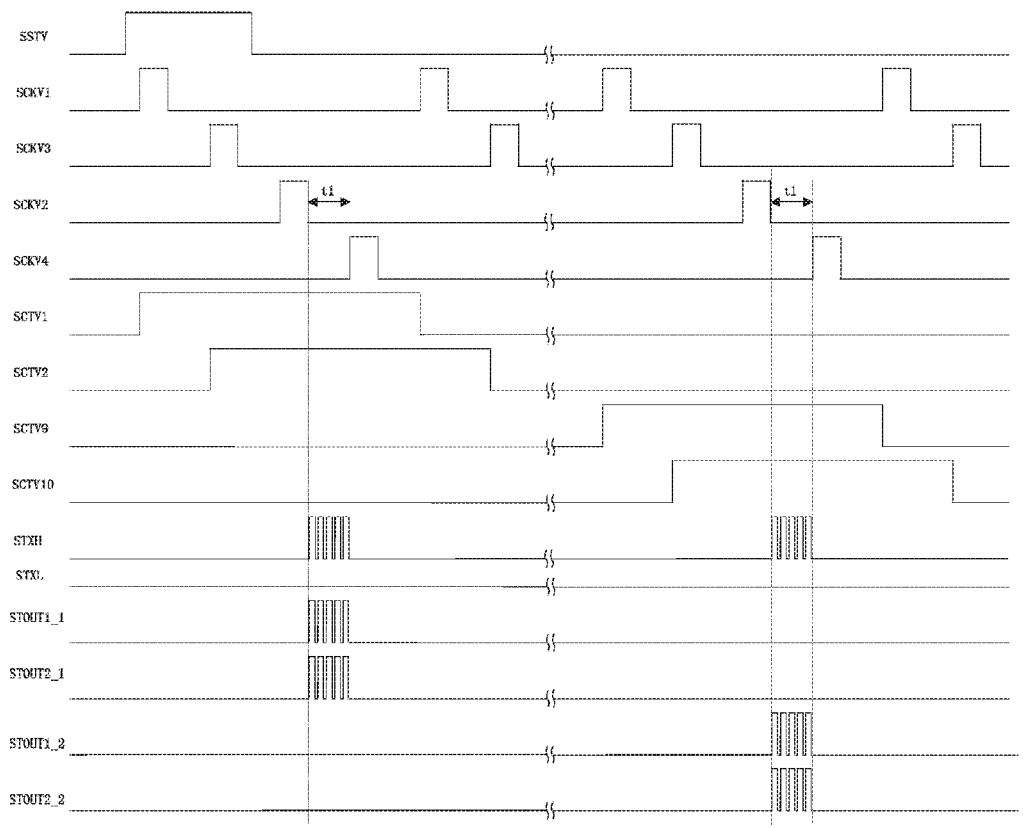
FIG. 14B is a timing diagram of the input signals of various input terminals and the output signals of various output terminals in FIG. 14A.

FIG. 14B is a timing diagram of the input signals of various input terminals and the output signals of various output terminals in FIG. 14A. In FIG. 14B, SSTV represents the trigger signal provided by the trigger signal line sty of the gate driving circuit; SCKV1 represents the first clock signal provided by the first clock signal line ckv1 of the first gate driving circuit; SCKV2 represents the second clock signal provided by the second clock signal line ckv2 of the first gate driving circuit, SCKV3 represents the third clock signal provided by the third clock signal line ckv3 of the second gate driving circuit; SCKV4 represents the fourth clock signal provided by the fourth clock signal line ckv4 of the second gate driving circuit; SCTV1 represents the secondary trigger signal generated by the first stage of shift register; SCTV2 represents the secondary trigger signal generated by the second stage of shift register; SCTV9 represents the secondary trigger signal generated by the ninth stage of shift register; SCTV10 represents the secondary trigger signal generated by the tenth stage of shift register; STXH represents the first signal provided by the first signal line TXH of the touch driving circuit; STXL represents the second signal provided by the second signal line TXL of the touch driving circuit, and the second signal is a low level signal; STOUT1_1 represents the touch driving signal outputted from the first stage of touch selection outputting unit of the first driving circuit; STOUT1_2 represents the touch driving signal outputted from the second stage of touch selection outputting unit from the first driving circuit; STOUT2_1 represents the touch driving signal outputted from the first stage of touch selection outputting unit from the second driving circuit and STOUT2_2 represents the touch driving signal outputted from the second stage of touch selection outputting unit from the second driving circuit.

In FIG. 14B, the trigger signal SSTV is at a high level to cover a first high level for both the first clock signal SCKV1 and the third clock signal SCKV3 in order to trigger corresponding gate driving circuits, and the first clock signal SCKV1, the third clock signal SCKV3, the second clock signal SCKV2, and the fourth clock signal SCKV4 are alternately at a high level to enable each stage of shift register to generate the active scanning signal and the secondary trigger signal (i.e. the scanning signal and secondary trigger signal each having a high level).

In embodiments of the disclosure, the display scanning and the touch scanning are performed in a time division manner. As shown in FIG. 14B, the first signal STXH is changed to a pulse signal at the end of a high level of the scanning signal from the first stage of shift register, i.e., at the first falling edge of the second clock signal SCKV2. Subsequently, the first signal STXH is changed back to a low level at the beginning of a high level of the scanning signal from the second stage of shift register, i.e. at the first rising edge of the fourth clock signal SCKV4. Accordingly, a duration for which the first signal STXH is a pulse signal is a time interval between the scanning signals respectively generated by the first stage of shift register and the second stage of shift register, that is, a time interval t1 between the time at the end of the first high level of the second clock signal SCKV2 and the time at the beginning of the first high level of the fourth clock signal SCKV4. Since the secondary trigger signal SCTV1 of the first stage of shift register and the secondary trigger signal SCTV2 of the second stage of shift register are generated simultaneously within the time interval t1, the corresponding touch driving signals are outputted simultaneously by the first stage of touch selection outputting unit from the first driving circuit and by the first stage of touch selection outputting unit from the second driving circuit, and both are pulse signals, i.e. active touch driving signals, during the time interval t1. As such, the first stage of touch selection outputting unit from the first driving circuit and the first stage of touch selection outputting unit from the second driving circuit can provide touch driving signals for one touch driving electrode. An analysis process of the corresponding touch driving signals generated by the second stages of touch selection outputting units from both the first driving circuit and the second driving circuit can refer to the analysis process of the touch driving signals generated by the first stages of touch selection outputting units from both the first driving circuit and the second driving circuit, which is not repeated here.

It is noted that, if the number of pluses contained in a pulse signal of the first signal TXH is increased, the time interval between scanning signals respectively generated by two adjacent stages of shift registers needs to be extended, and the corresponding timing diagram may refer to FIG. 8C, which is not repeated here.

It is noted that the number of pulses of the first signal STXH is five in FIGS. 8B, 11B and 14B, and the number of pulses of the first signal STXH is seven in FIG. 8C. However, those are merely examples of the first signal STXH, and another number of pulse signals in the first signal STXH may be selected according to actual design and requirements, which is not limited thereto.

As shown in FIGS. 5, 9 and 12, the display region 41 of the array substrate 40 further includes M touch driving electrodes 46; each stage of touch selection outputting unit from the touch driving circuit is electrically connected with one of the touch driving electrodes. With the array substrate shown in FIG. 12, the stages of touch selection outputting units respectively from the first driving circuit 431 and the second driving circuit 432 which are in the same numbered stage are electrically connected with the same touch driving electrode, and two corresponding touch selection outputting units simultaneously generate touch driving signals, which in turn provide the same touch driving electrode. The related operating principle may refer to FIG. 14B and related description, which is not repeated here.

Further, the M touch driving electrodes 46 may be multiplexed as common electrodes. Accordingly, each touch driving electrode at least covers one row or one column of pixel units along its width direction. If the touch driving electrodes function as common electrodes, the second signal provided by the second signal line of each stage of trigger selection outputting unit in the touch driving circuit is a common voltage signal.

Additionally, the M touch driving electrodes 46 may also be not multiplexed as common electrodes. Accordingly, the touch driving electrodes 46 and the common electrode may be located at the same layer, or may be located at different layers. With respect to such a case, the second signal inputting terminal of each stage of touch selection outputting unit from the touch driving circuit may be connected with the ground when the display scanning is performed.

Figure 15A:
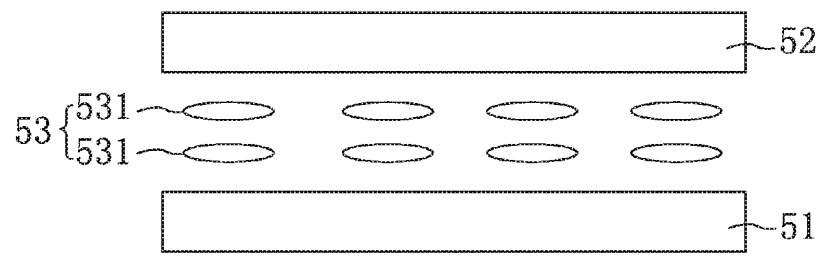
FIG. 15A is a schematic diagram of the structure of a touch display device, according to embodiments of the disclosure.

Embodiments of the disclosure further provide a touch display device. FIG. 15A is a schematic diagram of the structure of a touch display device, according to embodiments of the disclosure. As shown in FIG. 15A, the touch display device includes an array substrate 51, a color filter substrate 52 disposed opposite to the array substrate 51 and a liquid crystal layer 53 between the array substrate 51 and the color filter substrate 52, where, the liquid crystal layer 53 includes a plurality of liquid crystal molecules 531, and the array substrate 51 is the substrate according to the above embodiments.

Figures 15B, 16:
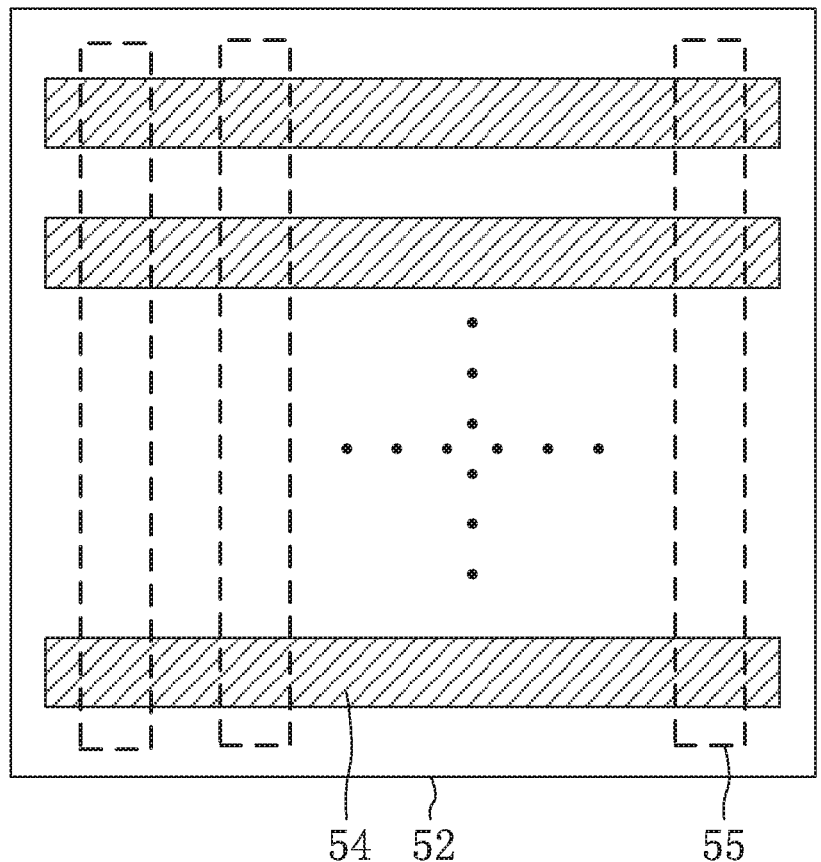
FIG. 15B is a top view of the touch display device shown in FIG. 15A.
FIG. 16 is a flowchart diagram of a driving method of the touch display device, according to embodiments of the disclosure.

FIG. 15B is a top view of the touch display device shown in FIG. 15A. As shown in FIG. 15B, the touch display device further includes a plurality of touch sensing electrodes 54 disposed at a side of the color filter substrate 52 away from the liquid crystal layer 53, where, the touch sensing electrodes 54 are disposed across with the touch driving electrodes 55. In addition to the configuration of the touch sensing electrodes shown in FIG. 15B, the touch sensing electrodes may also be disposed at any of the film layers on the color filter substrate 52, and may also be disposed at any of the film layers on the array substrate 51, where, the touch sensing electrodes may be disposed at the same layer as the touch driving electrodes, or at the different layers from the touch driving electrodes, which is not limited thereto. Additionally, the touch driving electrodes and the touch sensing electrodes each can form a self-capacitance along with ground so as to enable the touch display device to implement the capacitive touch function, or the touch driving electrodes and the touch sensing electrodes can together form a mutual capacitance to enable the touch display device to implement the capacitive touch function, which is not limited thereto.

Embodiments of the disclosure further provide a driving method of the touch display device, the touch display device includes a plurality of groups of scanning lines, a plurality of stages of shift registers, and a plurality of stages of touch selection outputting units, where, each of the groups of scanning lines includes a plurality of rows of scanning lines, each stage of shift register generates a scanning signal for scanning a scanning line and a secondary trigger signal for driving the following stage of shift register, each stage of touch selection outputting unit is configured to generate a touch driving signal according to the received secondary trigger signal. FIG. 16 is a flowchart diagram of a driving method of the touch display device, according to embodiments of the disclosure. As shown in FIG. 16, the driving method includes Steps 61 and 62 below:

At Step 61: applying the scanning signals to the scanning lines from each of the groups of scanning lines sequentially and scanning the scanning lines line by line; and At Step 62: generating a touch driving signal by the touch selection outputting unit according to the received secondary trigger signal, within scanning time interval between two adjacent groups of scanning lines.

It is noted that the active touch driving signal is a pulse signal, and if the number of pulses contained therein is changed, the corresponding duration for the pulse signal is also changed. If a scanning time interval between two adjacent scanning lines from each of the groups of scanning lines can meet the duration for which the touch driving signal is a pulse signal, then the scanning time interval between two adjacent groups of scanning lines is equal to the scanning time interval between two adjacent scanning lines from each of the groups of scanning lines; if the scanning time interval between two adjacent scanning lines from each of the groups of scanning lines cannot meet the duration for which the touch driving signal is a pulse signal, then the scanning time interval between two adjacent groups of scanning lines needs to be larger than the scanning time interval between two adjacent scanning lines from each of the groups of scanning lines, and in such case, the scanning time interval between two adjacent groups of scanning lines can be obtained by extending the scanning time interval between two adjacent scanning lines from each of the groups of scanning lines. Since the generation of the scanning signal is controlled by the IC, if the scanning time interval needs to be extended, it can be extended by configuring the IC.

With the driving circuit, the array substrate, the touch display device and the driving method of the touch display device, according to embodiments of the disclosure, the first gate driving circuit and the touch driving circuits electrically connected with the first gate driving circuit are both disposed in the driving circuit, and the secondary trigger signals outputted from the shift registers of the first gate driving circuit function as the strobe signals of the touch selection outputting units from the touch driving circuits, respectively. Accordingly, the touch driving circuits need not to dispose a scanning unit to provide the strobe signals for the touch selection outputting units, such that the touch driving circuits can be rather simple, and not only can easily implement a narrow frame of a touch display device, but also can reduce the number of the output signals of the IC and hence decrease the IC's cost.

It is noted that the embodiments and the applied technology principles of the disclosure are described as above. It should be understood that the disclosure is not limited to particular embodiments described herein. Various apparent changes, readjustments and alternatives can be made without departing from the scope of protection of the disclosure. Therefore, although the disclosure is illustrated in detail through the above embodiments, the disclosure is not limited to the above embodiments, and can further include more of other embodiments without departing from the conception of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A driving circuit, comprising: a first gate driving circuit and a touch driving circuit, wherein, the first gate driving circuit comprises N stages of shift registers electrically connected in series with each other, N is a positive integer larger than 1, wherein, each stage of shift register from the N stages of shift registers comprises a trigger signal inputting terminal and a secondary trigger signal outputting terminal; and for two adjacent stages of shift registers electrically connected in series from the N stages of shift registers, the secondary trigger signal outputting terminal of the preceding stage of shift register is electrically connected with the trigger signal inputting terminal of the next stage of shift register;

the touch driving circuit comprises M stages of touch selection outputting units for generating touch driving signals, M is a positive integer smaller than or equal to N, each stage of touch selection outputting unit from the M stages of touch selection outputting units comprises a strobe signal inputting terminal;

the strobe signal inputting terminals of the stages of touch selection outputting units from the touch driving circuit are respectively electrically connected with the secondary trigger signal outputting terminals of the corresponding stages of shift registers from the first gate driving circuit;

wherein, each stage of touch selection outputting unit further comprises: a buffer subunit, a first signal transmitting subunit, a second signal transmitting subunit and a touch driving signal outputting terminal, wherein, the buffer subunit is configured to buffer the strobe signal received from the strobe signal inputting terminal;

the first signal transmitting subunit is configured to transmit a first signal according to the strobe signal buffered by the buffer subunit, and the first signal in turn is outputted from the touch driving signal outputting terminal; and the second signal transmitting subunit is configured to transmit a second signal according to the strobe signal buffered by the buffer subunit, and the second signal is in turn outputted from the touch driving signal outputting terminal.

2. The driving circuit of claim 1, wherein, the buffer subunit comprises L1 first inverters comprising the first first inverter to the L1-th first inverter electrically connected in series with each other, an input terminal of the first first inverter is electrically connected with the strobe signal inputting terminal, and the L1-th first inverter is electrically connected with the first signal transmitting subunit and the second signal transmitting subunit, wherein, L1 is a positive integer;

the first signal transmitting subunit comprises a first NMOS transistor, a first PMOS transistor and a first signal inputting terminal, wherein, if L1 is an odd number, a gate electrode of the first NMOS transistor is electrically connected with an input terminal of the L1-th first inverter, and a gate electrode of the first PMOS transistor is electrically connected with an output terminal of the L1-th first inverter; if L1 is an even number, the gate electrode of the first PMOS transistor is electrically connected with the input terminal of the L1-th first inverter, and the gate electrode of the first NMOS transistor is electrically connected with the output terminal of the L1-th first inverter; a source electrode of the first NMOS transistor and a drain electrode of the first PMOS transistor are electrically connected with each other and further electrically connect with the first signal inputting terminal, and a drain electrode of the first NMOS transistor and a source electrode of the first PMOS transistor are electrically connected with each other and further electrically connect with the touch driving signal outputting terminal; and the second signal transmitting subunit comprises a second NMOS transistor, a second PMOS transistor and a second signal inputting terminal, wherein, if L1 is an odd number, a gate electrode of the second PMOS transistor is electrically connected with an input terminal of the L1-th first inverter, and a gate electrode of the second NMOS transistor is electrically connected with an output terminal of the L1-th first inverter; if L1 is an even number, the gate electrode of the second NMOS transistor is electrically connected with the input terminal of the L1-th first inverter, and the gate electrode of the second NMOS transistor is electrically connected with the output terminal of the L1-th first inverter; a source electrode of the second NMOS transistor and a drain electrode of the second PMOS are electrically connected with each other and further electrically connect with the second signal inputting terminal, and a drain electrode of the second NMOS transistor and a source electrode of the second PMOS transistor are electrically connected with each other and further electrically connect with the touch driving signal outputting terminal.

3. The driving circuit of claim 1, wherein, shift registers electrically connected with any two adjacent stages of the touch selection outputting units are spaced by the same number of stages of shift registers.

4. The driving circuit of claim 1 wherein, each stage of shift register further comprises: a latch, an NAND gate, a second inverter, a third inverter, a fourth inverter, a first clock signal inputting terminal, a second clock signal inputting terminal, a reset signal inputting terminal, and a scanning signal outputting terminal;

a first input terminal of the latch is electrically connected with the first clock signal inputting terminal of the stage of shift register, a second input terminal of the latch is electrically connected with the trigger signal inputting terminal of the stage of shift register, a third input terminal of the latch is electrically connected with the reset signal inputting terminal of the stage of shift register, and an output terminal of the latch is electrically connected with the secondary trigger signal outputting terminal; and a first input terminal of the NAND gate is electrically connected with the output terminal of the latch, a second input terminal of the NAND gate is electrically connected with the second clock signal inputting terminal, an output terminal of the NAND is electrically connected with an input terminal of the second inverter; the second inverter, the third inverter and the fourth inverter are electrically connected in series sequentially, and an output terminal of the fourth inverter is electrically connected with the scanning signal outputting terminal.

5. An array substrate, comprising: a display region and a peripheral region surrounding the display region, wherein, the peripheral region comprises a first driving circuit disposed at one side of the peripheral region, wherein, the first driving circuit is a driving circuit comprising: a first gate driving circuit and a touch driving circuit, wherein, the first gate driving circuit comprises N stages of shift registers electrically connected in series with each other, N is a positive integer larger than 1, wherein, each stage of shift register from the N stages of shift registers comprises a trigger signal inputting terminal and a secondary trigger signal outputting terminal; and for two adjacent stages of shift registers electrically connected in series from the N stages of shift registers, the secondary trigger signal outputting terminal of the preceding stage of shift register is electrically connected with the trigger signal inputting terminal of the next stage of shift register;

the touch driving circuit comprises M stages of touch selection outputting units for generating touch driving signals, M is a positive integer smaller than or equal to N, each stage of touch selection outputting unit from the M stages of touch selection outputting units comprises a strobe signal inputting terminal;

the strobe signal inputting terminals of the stages of touch selection outputting units from the touch driving circuit are respectively electrically connected with the secondary trigger signal outputting terminals of the corresponding stages of shift registers from the first gate driving circuit;

the display region comprises N rows of scanning lines, and each stage of shift register from the first gate controlling circuit provides a scanning signal for one of the N rows of scanning lines; and wherein, the peripheral region of the array substrate further comprise: a first signal line, a second signal line, a trigger signal line, a first reset signal line, a first clock signal line and a second clock signal line;

a first signal inputting terminal of each stage of touch selection outputting unit from the touch driving circuit is electrically connected with the first signal line, and a second signal inputting terminal of each stage of touch selection outputting unit from the touch driving circuit is electrically connected with the second signal line;

a trigger signal terminal of the first stage of shift register from the first gate driving circuit is electrically connected with the trigger signal line, and the reset signal terminal of each stage of shift register from the first gate driving circuit is electrically connected with the first reset signal line; and the first clock signal inputting terminals of the stages of shift registers from the first gate driving circuit are alternately electrically connected with the first clock signal line and the second clock signal line, the second clock signal inputting terminals of the stages of shift registers from the first gate driving circuit are alternately electrically connected with the first clock signal line and the second clock signal line, and the clock signal line electrically connected with the first clock signal inputting terminal of each stage of shift register is different from the clock signal line electrically connected with the second clock signal inputting terminal of the stage of shift register.

6. The array substrate of claim 5, wherein, the display region of the array substrate further comprises M touch driving electrodes;

each stage of touch selection outputting unit from the touch driving circuit is electrically connected with one of the touch driving electrodes.

7. The array substrate of claim 6, wherein, the M touch driving electrodes are multiplexed as common electrodes.

8. The array substrate of claim 7, wherein, a second signal received by a second signal inputting terminal of each stage of touch selection outputting unit from the touch driving circuit is a common voltage signal.

9. An array substrate, comprising: a display region and a peripheral region surrounding the display region, wherein, the peripheral region comprises a first driving circuit disposed at one side of the peripheral region and a second gate driving circuit disposed opposite to the first driving circuit, wherein, the first driving circuit is a driving circuit comprising: a first gate driving circuit and a touch driving circuit, and the second gate driving circuit is the same as the first gate driving circuit from the first driving circuit, wherein, the first gate driving circuit comprises N stages of shift registers electrically connected in series with each other, N is a positive integer larger than 1, wherein, each stage of shift register from the N stages of shift registers comprises a trigger signal inputting terminal and a secondary trigger signal outputting terminal; and for two adjacent stages of shift registers electrically connected in series from the N stages of shift registers, the secondary trigger signal outputting terminal of the preceding stage of shift register is electrically connected with the trigger signal inputting terminal of the next stage of shift register;

the touch driving circuit comprises M stages of touch selection outputting units for generating touch driving signals, M is a positive integer smaller than or equal to N, each stage of touch selection outputting unit from the M stages of touch selection outputting units comprises a strobe signal inputting terminal;

the strobe signal inputting terminals of the stages of touch selection outputting units from the touch driving circuit are respectively electrically connected with the secondary trigger signal outputting terminals of the corresponding stages of shift registers from the first gate driving circuit;

the peripheral region of the array substrate further comprises: a first signal line, a second signal line, a trigger signal line, a reset signal line, a first clock signal line, a second clock signal line, a third clock signal line and a fourth clock signal line;

the first signal inputting terminal of each stage of touch selection outputting unit from the touch driving circuit is electrically connected with the first signal line, and the second signal inputting terminal of each stage of touch selection outputting unit from the touch driving circuit is electrically connected with the second signal line;

the trigger signal terminal of the first stage of shift register from each of the first gate driving circuit and the second gate driving circuit is electrically connected with the trigger signal line, and the reset signal terminal of each stage of shift register from each of the first gate driving circuit and the second gate driving circuit is electrically connected with the reset signal line;

the first clock signal inputting terminals of the stages of shift registers from the first gate driving circuit are alternately electrically connected with the first clock signal line and the second clock signal line, the second clock signal inputting terminals of the stages of shift registers from the first gate driving circuit are alternately electrically connected with the first clock signal line and the second clock signal line, and the clock signal line electrically connected with the first clock signal inputting terminal of each stage of shift register from the first gate driving circuit is different from the clock signal line electrically connected with the second clock signal inputting terminal of the stage of shift register; and the first clock signal inputting terminals of the stages of shift registers from the second gate driving circuit are alternately electrically connected with the third clock signal line and the fourth clock signal line, the second clock signal inputting terminals of the stages of shift registers from the second gate driving circuit are alternately electrically connected with the third clock signal line and the fourth clock signal line, and the clock signal line electrically connected with the first clock signal inputting terminal of each stage of shift register from the second gate driving circuit is different from the clock signal line electrically connected with the second clock signal inputting terminal of the stage of shift register.

10. A touch display device, comprising an array substrate, a color filter substrate disposed opposite to the array substrate and a liquid crystal layer between the array substrate and the color filter substrate, wherein, the array substrate comprises: a display region and a peripheral region surrounding the display region, wherein, the peripheral region comprises a first driving circuit disposed at one side of the peripheral region, wherein, the first driving circuit is a driving circuit comprising: a first gate driving circuit and a touch driving circuit, wherein, the first gate driving circuit comprises N stages of shift registers electrically connected in series with each other, N is a positive integer larger than 1, wherein, each stage of shift register from the N stages of shift registers comprises a trigger signal inputting terminal and a secondary trigger signal outputting terminal; and for two adjacent stages of shift registers electrically connected in series from the N stages of shift registers, the secondary trigger signal outputting terminal of the preceding stage of shift register is electrically connected with the trigger signal inputting terminal of the next stage of shift register;

the touch driving circuit comprises M stages of touch selection outputting units for generating touch driving signals, M is a positive integer smaller than or equal to N, each stage of touch selection outputting unit from the M stages of touch selection outputting units comprises a strobe signal inputting terminal;

the strobe signal inputting terminals of the stages of touch selection outputting units from the touch driving circuit are respectively electrically connected with the secondary trigger signal outputting terminals of the corresponding stages of shift registers from the first gate driving circuit;

wherein, each stage of touch selection outputting unit further comprises: a buffer subunit, a first signal transmitting subunit, a second signal transmitting subunit and a touch driving signal outputting terminal, wherein, the buffer subunit is configured to buffer the strobe signal received from the strobe signal inputting terminal;

the first signal transmitting subunit is configured to transmit a first signal according to the strobe signal buffered by the buffer subunit, and the first signal in turn is outputted from the touch driving signal outputting terminal; and the second signal transmitting subunit is configured to transmit a second signal according to the strobe signal buffered by the buffer subunit, and the second signal is in turn outputted from the touch driving signal outputting terminal.

11. The touch display device of claim 10, wherein the touch display device further comprises a plurality of touch sensing electrodes disposed at one side of the color filter substrate away from the liquid crystal layer, wherein, the touch sensing electrodes are disposed across with the touch driving electrodes.

12. A driving method of the touch display device, the touch display device comprises a plurality of groups of scanning lines, a plurality of stages of shift registers, and a plurality of stages of touch selection outputting units, wherein, the plurality of stages of shift registers comprises N stages of shift registers electrically connected in series with each other, N is a positive integer larger than 1, wherein, each stage of shift register from the N stages of shift registers comprises a trigger signal inputting terminal and a secondary trigger signal outputting terminal; and for two adjacent stages of shift registers electrically connected in series from the N stages of shift registers, the secondary trigger signal outputting terminal of the preceding stage of shift register is electrically connected with the trigger signal inputting terminal of the next stage of shift register;

the plurality of stages of touch selection outputting units comprises M stages of touch selection outputting units for generating touch driving signals, M is a positive integer smaller than or equal to N, each stage of touch selection outputting unit from the M stages of touch selection outputting units comprises a strobe signal inputting terminal;

the strobe signal inputting terminals of the stages of touch selection outputting units from the plurality of stages of touch selection outputting units are respectively electrically connected with the secondary trigger signal outputting terminals of the corresponding stages of shift registers from the plurality of stages of shift registers;

wherein, each stage of touch selection outputting unit further comprises: a buffer subunit, a first signal transmitting subunit, a second signal transmitting subunit and a touch driving signal outputting terminal, wherein, the buffer subunit is configured to buffer the strobe signal received from the strobe signal inputting terminal;

the first signal transmitting subunit is configured to transmit a first signal according to the strobe signal buffered by the buffer subunit, and the first signal in turn is outputted from the touch driving signal outputting terminal;

the second signal transmitting subunit is configured to transmit a second signal according to the strobe signal buffered by the buffer subunit, and the second signal is in turn outputted from the touch driving signal outputting terminal;

each of the groups of scanning lines comprise a plurality rows of scanning lines, each stage of shift registers generate a scanning signal for scanning a scanning line and a secondary trigger signal for driving the following stage of shift register, each stage of touch selection outputting unit is configured to generate a touch driving signal according to the received secondary trigger signal, wherein, the driving method comprises:

applying the scanning signals to the scanning lines from each of the groups of scanning lines sequentially and scanning the scanning lines line by line; and generating the touch driving signal by the touch selection outputting unit according to the received secondary trigger signal, within the scanning time interval between two adjacent groups of scanning lines.

* * * * *